US012782298B2

(12) United States Patent
Fujita et al.

(10) Patent No.: US 12,782,298 B2
(45) Date of Patent: Nov. 3, 2026

(54) OBSERVATION DEVICE, AND CROSS-SECTIONAL IMAGE ACQUISITION METHOD

(71) Applicant: RIKEN, Wako (JP)

(72) Inventors: Kunihiro Fujita, Wako (JP); Takaoki Takanashi, Wako (JP); Chihiro Iwamoto, Wako (JP); Yoshie Otake, Wako (JP)

(73) Assignee: RIKEN (JP)

( * ) Notice: Subject to any disclaimer, the term of this patent is extended or adjusted under 35 U.S.C. 154(b) by 176 days.

(21) Appl. No.: 18/712,873

(22) PCT Filed: Oct. 25, 2022

(86) PCT No.: PCT/JP2022/039678
§ 371 (c)(1),
(2) Date: May 23, 2024

(87) PCT Pub. No.: WO2023/095513
PCT Pub. Date: Jun. 1, 2023

(65) Prior Publication Data

US 2025/0027890 A1 Jan. 23, 2025

(30) Foreign Application Priority Data

Nov. 24, 2021 (JP) ................................ 2021-190288

(51) Int. Cl.
*G01N 23/05* (2006.01)

(52) U.S. Cl.
CPC ....... *G01N 23/05* (2013.01); *G01N 2223/419* (2013.01); *G01N 2223/628* (2013.01); *G01N 2223/646* (2013.01)

(58) Field of Classification Search
CPC ..................................................... G01N 23/05
See application file for complete search history.

(56) References Cited

U.S. PATENT DOCUMENTS 6,009,142 A 12/1999 Sauer et al.
2009/0006019 A1 1/2009 Kang et al.
(Continued)

FOREIGN PATENT DOCUMENTS

JP S62085849 A 4/1987
JP 10-282019 A 10/1998
(Continued)

OTHER PUBLICATIONS

International Search Report, PCT/JP2022/039678, Dec. 6, 2022, 11 pgs.

(Continued)

*Primary Examiner* — Edwin C Gunberg
(74) *Attorney, Agent, or Firm* — Volpe Koenig

(57) ABSTRACT

An observation device includes a neutron emission device, a detection device, and a data processing device. The neutron emission device emits neutrons to an inspection object. The detection device detects exit neutrons from the inspection object at one set of detection positions in a peripheral direction around the inspection object, outside the inspection object, and measures the number of the detected exit neutrons for each of the detection positions. The data processing device generates reconstructed cross-sectional data by performing reconstruction processing based on the number of the detected exit neutrons at each of the one set of detection positions. The reconstructed cross-sectional data represent a two-dimensional distribution of a neutron reaction rate in an imaginary cross-section of the inspection object.

20 Claims, 19 Drawing Sheets

(56) References Cited

U.S. PATENT DOCUMENTS

| | | | | |
|---|---|---|---|---|
| 2013/0264486 | A1* | 10/2013 | Bingham | G01V 5/20 250/391 |
| 2018/0209923 | A1 | 7/2018 | Joyce et al. | |
| 2018/0259462 | A1 | 9/2018 | Otake et al. | |
| 2020/0081150 | A1* | 3/2020 | Inanc | G01V 5/107 |
| 2021/0262947 | A1 | 8/2021 | Takanashi et al. | |
| 2023/0213462 | A1 | 7/2023 | Otake et al. | |

FOREIGN PATENT DOCUMENTS

| | | | |
|---|---|---|---|
| JP | 2007-333663 | A | 12/2007 |
| JP | 2009-014705 | A | 1/2009 |
| JP | 5022886 | B2 | 9/2012 |
| JP | 2021-067585 | A | 4/2021 |
| WO | 2017/043581 | A1 | 3/2017 |
| WO | 2021261405 | A1 | 12/2021 |

OTHER PUBLICATIONS

Extended European Search Report issued on Mar. 10, 2025 for European Patent Application No. 22898297.1.

International Preliminary Report on Patentability issued on May 2, 2024 for PCT Patent Application No. PCT/JP2022/039678.

* cited by examiner

OBSERVATION DEVICE, AND CROSS-SECTIONAL IMAGE ACQUISITION METHOD

TECHNICAL FIELD

The present invention relates to a non-destructive imaging technique and method of emitting neutrons to an inspection object and inspecting an inside of the inspection object, based on exit neutrons that result from the emission of the neutrons and that exit from the inside of the inspection object to an outside of the inspection object.

BACKGROUND ART

Structures (hereinafter, referred to as infrastructures) provided in infrastructure constructions that form foundations for industry, life, or the like include a pipeline (e.g., a steel pipe) through which LNG or another fluid flows, and a support structure (e.g., a pillar or a cable) that supports a certain structure. The infrastructure may have a defect inside the structure due to improper initial construction, deterioration, or the like. Examples of the defect include a stagnant-water spot, rust, and a void that are present inside the infrastructure. For that reason, the infrastructure is targeted as an inspection object, and presence or absence of a defect inside the infrastructure is inspected.

Patent Literature 1 discloses a technique of using a neutron beam to inspect whether or not a generated defect exists inside an inspection object. In Patent Literature 1, the following inspection is performed. A pulsed neutron beam is emitted to an inspection object such as a runway of an airport or a road for automobiles. The scattered neutrons that are scattered in the inspection object and returned are detected to generate the detection number data. The detection number data express the number of times of detecting the scattered neutron, in relation to elapsed time. Then, based on the detection number data, it is determined whether a defect exists inside the inspection object.

CITATION LIST

Patent Literature

Patent Literature 1: International Publication No. WO2017/043581

SUMMARY OF INVENTION

Technical Problem

In a case of inspection using neutrons emitted to an inspection object, it is desired to enable two-dimensional recognition of a state (e.g., a position or an existence range of a defect on an imaginary section) on an imaginary section of the inspection object. In a case of inspection using neutrons emitted to an inspection object, it is desired to enable three-dimensional recognition of a state (e.g., a position or an existence range of a defect on an imaginary section) on an imaginary section of the inspection object.

In view of the above, an object of the present invention is to provide a technique that enables two-dimensional recognition of a state on an imaginary section of an inspection object in a case of inspection using neutrons emitted to the inspection object.

Another object of the present invention is to provide a non-destructive imaging technique and method that enable three-dimensional recognition of a state on an imaginary section of an inspection object in a case of inspection using neutrons emitted to the inspection object.

Solution to Problem

An observation device according to an aspect of the present invention includes:

a neutron emission device that emits neutrons to an inspection object;

a detection device that detects exit neutrons from the inspection object at one set of detection positions in a peripheral direction around the inspection object, outside the inspection object, and measures a number of the detected exit neutrons for each of the detection positions; and a data processing device that generate reconstructed cross-sectional data by performing reconstruction processing based on the number of the detected exit neutrons at each of the one set of detection positions, wherein the reconstructed cross-sectional data represent a two-dimensional distribution of a neutron reaction rate in an imaginary cross-section of the inspection object.

In this case, the three-dimensional internal data may be acquired as follows. The peripheral direction is a direction of rotating around an imaginary reference line passing through an inside of the inspection object, and an imaginary plane intersecting the reference line is defined as an inspection plane, for each of the inspection planes whose positions in a direction of the reference line are different from each other, the detection device detects the exit neutrons from the inspection object at each of the one set of detection positions in the peripheral direction on the inspection plane, and measures the number of the exit neutrons at each of the detection positions, the data processing device generates, for each of the inspection planes, the reconstructed cross-sectional data, based on the number of detected exit neutrons at each of the one set of detection positions in the inspection plane, and generates three-dimensional internal data, based on a plurality of pieces of the reconstructed cross-sectional data, and the three-dimensional internal data represent a three-dimensional distribution of a neutron reaction rate inside the inspection object.

Further, a cross-sectional image acquisition method according to an aspect of the present invention includes:

emitting neutrons to an inspection object;

detecting exit neutrons that exit from the inspection object as a result of the emitting, at one set of detection positions in a peripheral direction around the inspection object, and measuring a number of the detected exit neutrons at each of the detection positions; and by a data processing device, performing reconstruction processing based on the number of exit neutrons at each of the one set of detection positions, and thereby generating reconstructed cross-sectional data, wherein the reconstructed cross-sectional data represent a two-dimensional distribution of a neutron reaction rate in an imaginary cross-section of the inspection object.

In this case, the three-dimensional internal data may be acquired as follows. The peripheral direction is a direction of rotating around an imaginary reference line passing through an inside of the inspection object, and an imaginary plane intersecting the reference line is defined as an inspection plane, the method further includes:

for the one set of detection positions on each of the inspection planes whose positions in a direction of the reference line are different from each other, detecting exit neutrons that exit from the inspection object as a result of emitting neutrons to the inspection object, at each of the one set of detection positions, and measuring the number of the detected exit neutrons at each of the detection positions;

for each of the inspection planes, by the data processing device, performing the reconstruction processing based on the number of detected exit neutrons at each of the one set of detection positions, and thereby generating the reconstructed cross-sectional data; and generating three-dimensional internal data based on a plurality of pieces of the reconstructed cross-sectional data, and the three-dimensional internal data represent a three-dimensional distribution of a neutron reaction rate inside the inspection object.

Advantageous Effects of the Invention

The reconstructed cross-sectional data generated by the present invention represent a two-dimensional distribution of a neutron reaction rate in the imaginary cross-section inside the inspection object. A neutron reaction rate varies depending on a state at each position in the imaginary cross-section. Thus, a state in the imaginary cross-section can be two-dimensionally recognized from the two-dimensional distribution of a neutron reaction rate represented by the reconstructed cross-sectional data.

In a case of generating the three-dimensional internal data as described above, a state inside the inspection object can be three-dimensionally recognized from the three-dimensional distribution of the neutron reaction rate represented by the three-dimensional internal data.

DESCRIPTION OF EMBODIMENTS

The following describes an embodiment of the present invention with reference to the drawings. The same reference signs are attached to the parts that are common in the respective drawings, and overlapping description is omitted.

Figure 1:
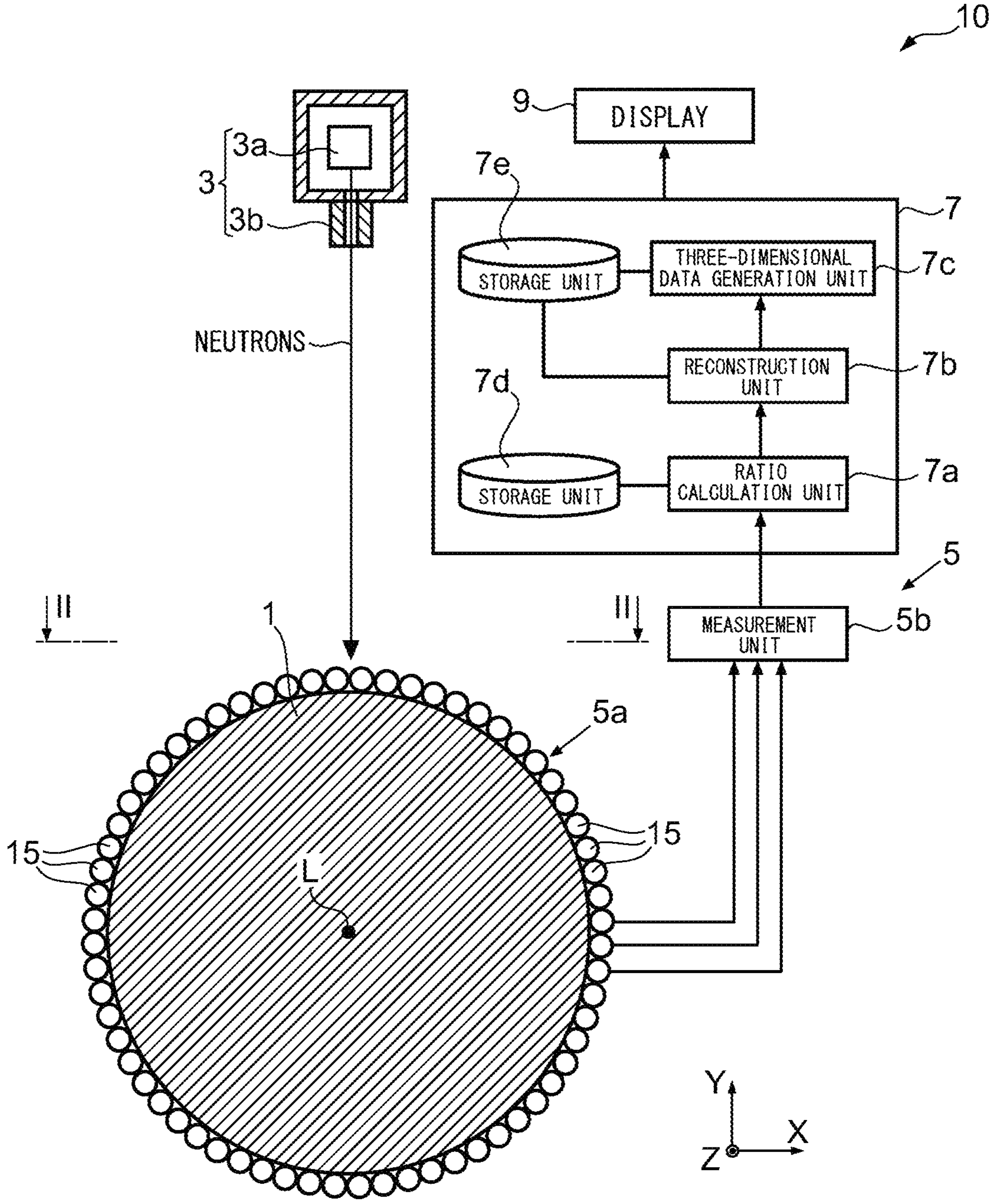
FIG. 1 illustrates an observation device according to an embodiment of the present invention.
Figure 2:
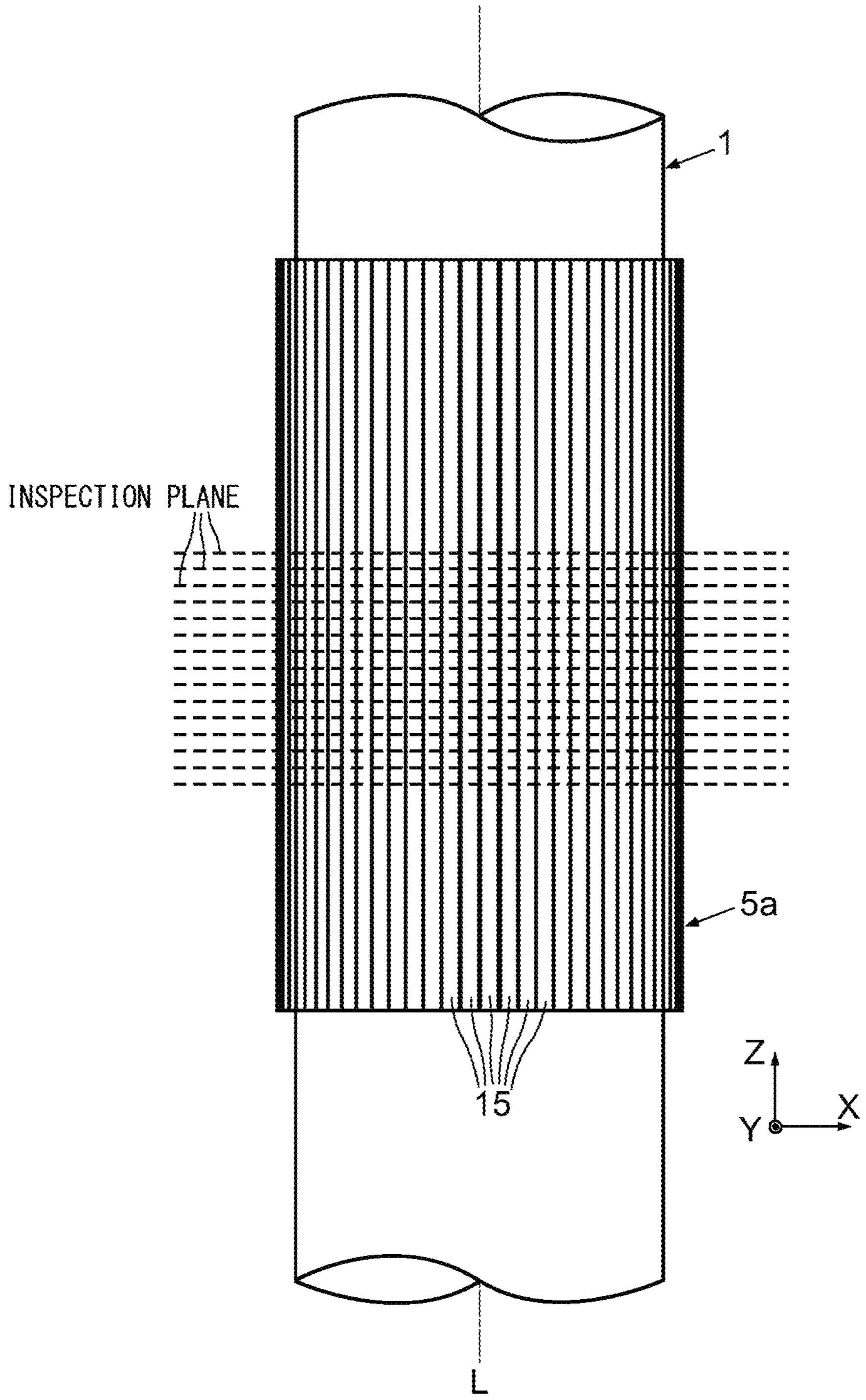
FIG. 2 is a II-II arrow view in FIG. 1.

FIG. 1 illustrates an observation device 10 according to the embodiment of the present invention. FIG. 2 is a II-II arrow view in FIG. 1. The observation device 10 emits neutrons to the inspection object 1. Then, based on the exit neutrons that exit (move out) from the inspection object 1 as a result of the emission of the neutrons, the observation device 10 generates data representing a two-dimensional distribution or a three-dimensional distribution of a neutron reaction rate inside an inspection object 1. Here, the neutron reaction rate indicates a reaction rate at each position inside the inspection object 1. The neutron reaction rate represents a reaction probability for a neutron. The neutron reaction rate is derived from a density and a composition of elements of the inspection object 1 at the position.

In the present embodiment, the exit neutrons are neutrons that are emitted to the inspection object 1 and then move out from an inside of the inspection object 1. The exit neutrons are neutrons that are mainly scattered inside the inspection object 1 and exit from the inspection object 1 to an outside of the inspection object 1. The exit neutrons may include neutrons that exit from the inspection object 1 to an outside of the inspection object 1 by being transmitted through the inspection object 1 without being scattered in the inspection object 1.

(Inspection Object)

The inspection object 1 may be an object including an outer periphery that can be surrounded by a plurality of detection positions of the below-described detection unit 5*a*. Such an inspection object 1 may be a pipe, a pillar, a cable, or the like. For example, the pipe as the inspection object 1 may be a pipe through which LNG or another fluid flows. The pillar or the cable as the inspection object 1 may be a pillar or a cable that supports a construction or a structure. Such an inspection object 1 may be the above-described infrastructure. FIG. 1 illustrates a cross-section of a columnar inspection object 1.

When neutrons are emitted to the inspection object 1, the inspection object 1 scatters the neutrons (e.g., at a probability equal to or higher than 30%, 50%, or 80%) inside the inspection object 1 itself. Such an inspection object 1 may be made of metal (steel in one example) or concrete, for example, or may be made of another material. The inspection object 1 may include a plurality of parts made of mutually different materials.

The inspection object 1 may be inspected for a defect that may exist inside the inspection object 1. Examples of such a defect include a stagnant-water portion (water), rust, a void, or a reduction in a thickness or a material density (a reduction in a thickness or a material density of the pipe as the inspection object 1) inside the inspection object 1. Alternatively, the inspection object 1 may be inspected for a state of fluid existing in an inside space of the inspection object 1. In this case, the inspection object 1 may be, for example, a pipe through which the fluid flows in the inside space of the inspection object 1. When hydrogen elements exist inside the inspection object 1, the neutrons incident on the inspection object 1 react with the hydrogen elements (e.g., hydrogens in the stagnant-water portion or rust or hydrogens contained in the above-described fluid) and are easily decelerated (by being elastically scattered by hydrogen atomic nuclei). Thus, such an influence on neutrons appears in the below-described reconstructed cross-sectional data. Meanwhile, when a low-density portion due to a void, a reduction in a thickness or a material density, or the like exists as a defect inside the inspection object 1, the neutrons incident on the inspection object 1 are hardly scattered and hardly decelerated in the low-density portion. Thus, such a result for the neutrons appears in the below-described reconstructed cross-sectional data.

The inspection object 1 may be any object as long as the sectional image acquisition method of the present invention can be performed. Thus, the inspection object 1 is not limited to the above-described object. For example, the inspection object 1 may be one other than the infrastructure.

(Configuration of Observation Device)

The observation device 10 includes a neutron emission device 3, a detection device 5, and a data processing device 7.

<Neutron Emission Device>

The neutron emission device 3 emits a large number of neutrons (e.g., a neutron beam) to the inspection object 1. The neutron emission device 3 includes a neutron source 3*a* that emits neutrons. At the time of inspection, the neutron emission device 3 emits, to the inspection object 1, a large number of neutrons from the neutron source 3*a*.

In one example, the neutron source 3*a* may include a target that emits neutrons by being irradiated with a charged particle beam. In this case, the target may be lithium, but is not limited to this. In another example, the neutron source 3*a* may be a portable DD nuclear fusion reaction neutron source (DD pipe). In still another example, the neutron source 3*a* may be a radioactive neutron source (radioactive isotope (RI) neutron source) that emits neutrons. In this case, the radioactive neutron source may be $^{252}$Cf, but is not limited to this.

The neutron emission device 3 may include a collimator 3*b*, or does not need to include the collimator 3*b*. The collimator 3*b* shapes the neutrons from the neutron source 3*a* into a neutron beam having a reduced cross-section. In this case, the neutron emission device 3 irradiates the inspection object 1 with the thus-shaped neutron beam.

The neutron emission device 3 may emit pulsed neutrons (e.g., a pulsed neutron beam) to the inspection object 1, or may emit neutrons (e.g., a neutron beam) to the inspection object continuously in time. In the former case, a pulse time with (duration) of the pulsed neutrons is, for example, approximately 0.1 milliseconds or shorter than 0.1 milliseconds, and a repetition frequency (a frequency of emitting the neutrons to the inspection object 1) of the pulsed neutrons is, for example, approximately 100 Hz, but is not limited to this.

In one example, the above-described charged particle beam is a pulsed charged particle beam so that the neutron emission device 3 emits pulsed neutrons to the inspection object. However, the neutron emission device 3 may be configured to emit pulsed neutrons to the inspection object 1 by another method.

A large number of the neutrons emitted by the neutron emission device 3 to the inspection object 1 may mainly include fast neutrons, for example, or may include fast neutrons and thermal neutrons, or may mainly include thermal neutrons. However, there is no limitation to these.

<Detection Device>

The detection device 5 detects the exit neutrons from the inspection object 1, at each of a plurality of detection positions (hereinafter, also referred to simply as one set of detection positions) in the peripheral direction (hereinafter, also simply referred to as the peripheral direction) around the inspection object 1, outside the inspection object 1. The detection device 5 measures the number of the detected exit neutrons, for each of the detection positions. The peripheral direction is a direction of rotating around a reference line L as illustrated in FIG. 1. The reference line L is an imaginary line (e.g., a line passing through an inside of the inspection object 1) surrounded by one set of detection positions. The reference line L may be a center with respect to one set of detection positions. In this case, when the inspection object 1 extends in an elongated shape like a pipe or a cable, the reference line L may be a center axis of the inspection object 1.

One set of the detection positions may be a plurality (a large number) of detection positions set to surround the inspection object 1. In this case, one set of detection positions may be arranged at an equal angular interval (an equal angular interval for the center that is the reference line L) entirely in the peripheral direction. One set of detection positions may be a large number of detection positions that are densely (continuously) arranged in the peripheral direction. One set of the detection positions may be set on an imaginary circle as illustrated in FIG. 1 (e.g., at an equal angular interval, i.e., at an equal interval), or may be set on an outer peripheral line of another shape (e.g., a rectangle) surrounding the inspection object 1.

In the following, an inspection plane is an imaginary plane that intersects (e.g., is perpendicular to) the reference line L. One set of the detection positions are positioned on one inspection plane. In other words, one set of detection positions are included in one inspection plane. For one inspection plane or each of a plurality of inspection planes (hereinafter, also referred to simply as a plurality of inspection planes) whose positions differ from each other in the direction of the reference line L, the detection device 5 detects the exit neutrons from the inspection object 1, at each of one set of detection positions on the inspection plane, and measures the number of the detected exit neutrons at each of one set of detection positions. FIG. 2 depicts the respective inspection planes by broken lines.

The detection device 5 includes a detection unit 5*a* and a measurement unit 5*b*.

For each detection position on one inspection plane or each of a plurality of the inspection planes, the detection unit 5*a* outputs a detection signal indicating that the neutron is incident on the detection position, each time the neutron is incident on the detection position. The detection unit 5*a* may be configured in such a way as to selectively detect neutrons (e.g., thermal neutrons) each having an energy equal to or lower than a predetermined value and in such a way as not to detect neutrons each having an energy higher than the predetermined value. Here, the predetermined value may be a value lower than an average energy (e.g., an energy of the fast neutron) of the neutrons emitted by the neutron emission device 3 to the inspection object 1.

The detection unit 5*a* may include a position sensitive detector (PSD) 15. In this case, for example, as illustrated in FIG. 1, the detection unit 5*a* includes a plurality of (64 in the example of FIG. 1) detectors 15 that are arranged at one set of detection positions in the peripheral direction and that each extend in an elongated shape in the direction of the reference line L as illustrated in FIG. 2.

When the detection unit 5*a* is configured in such a way as to selectively detect thermal neutrons, the detection unit 5*a* may use a helium-3 ($^{3}He$) proportional counter, or may be a combination of a scintillator including lithium 6 ($^{6}Li$) and an optical sensor.

The detection unit 5*a* may be configured in such a way as to selectively detect intermediate neutrons and in such a way as not to detect neutrons other than the intermediate neutrons. In this case, the detection unit 5*a* may be a combination of a scintillator containing at least one of chlorine ($^{35}Cl$) or bromine ($^{79}Br$, $^{81}Br$) and an optical sensor. For example, the detection unit 5*a* may be a combination of a scintillator containing CLYC or $LaBr_3$ and an optical sensor.

The detection unit 5*a* is not limited to those described above, and may be, for example, a combination of a scintillator including $^{155}Gd$, $^{157}Gd$, $^{10}B$, or the like and an optical sensor, or may include a neutron imaging plate. The neutron imaging plate is one in which Gd or $^{6}Li$ is mixed with a stimulable phosphor. Each of the above-described optical sensors may be a photomultiplier tube or a silicon photomultiplier (SiPM), but is not limited to these.

Generally, thermal neutrons indicate neutrons each having an energy equal to or lower than an energy value of approximately 25 meV at a room temperature, the intermediate neutrons indicate neutrons each having an energy (equal to or higher than several kilo-electron volts and lower than several hundreds of kilo-electron volts) sufficiently higher than that of the thermal neutron, and the fast neutrons indicate neutrons each having an energy equal to or higher than several hundreds of kilo-electron volts. There are no strict definitions of the threshold values for the names of the neutrons depending on an energy. In view of it, in the definitions of the present application, the thermal neutrons may be neutrons each having an energy equal to or lower than several tens of milli-electron volts (e.g., 50 meV), the intermediate neutrons may be neutrons each having an energy equal to or higher than several kilo-electron volts (e.g., 5 keV) and lower than several hundreds of kilo-electron volts (e.g., 500 keV), and the fast neutrons may be neutrons each having an energy (e.g., 500 keV) equal to or higher than energy of several hundreds of kilo-electron volts.

For one inspection plane or each of a plurality of the inspection planes, the measurement unit 5*b* measures the number of the detected exit neutrons at each of one set of detection positions on the inspection plane, based on a large number of detection signals output from the detection unit 5*a*. When the above-described optical sensor is used, the measurement unit 5*b* may be incorporated in the above-described optical sensor such as SiPM.

<Data Processing Device>

The data processing device 7 generates reconstructed cross-sectional data by performing reconstruction processing based on the number of the detected exit neutrons measured by the detection device 5 (measurement unit 5*b*), at each of one set of detection positions. The reconstructed cross-sectional data represents a two-dimensional distribution of a neutron reaction rate in the imaginary cross-section of the inspection object 1. In other words, the reconstructed cross-sectional data represents a neutron reaction rate at each two-dimensional coordinate on the imaginary cross-section in the inspection object 1. The imaginary cross-section, one set of detection positions, and the inspection plane are associated with each other. In other words, the imaginary cross-section is a cross-section (hereinafter, also referred to simply as an imaginary cross-section) of the inspection object 1 cut by the inspection plane including one set of detection positions.

When the number of the detected exit neutrons at each of one set of detection positions in each of a plurality of the inspection planes is measured by the detection device 5, the data processing device 7 may generate, for each of the inspection planes, the reconstructed cross-sectional data, based on a plurality of the respective numbers of the detected exit neutrons at one set of detection positions in the inspection plane, and generate three-dimensional internal data, based on a plurality of pieces of the reconstructed cross-sectional data. The three-dimensional internal data represent a three-dimensional distribution of a neutron reaction rate inside the inspection object 1. In other words, the three-dimensional internal data represents, for each of three-dimensional coordinates inside the inspection object 1, a neutron reaction rate at the three-dimensional coordinate. A plurality of the inspection planes may be planes (e.g., a large number of planes) that are densely arranged (continuously arranged) in the direction of the reference line L as illustrated in FIG. 2.

The data processing device 7 includes a ratio calculation unit 7*a*, a reconstruction unit 7*b*, and a three-dimensional data generation unit 7*c*. The ratio calculation unit 7*a* and the reconstruction unit 7*b* generate the reconstructed cross-sectional data by performing the following processing on one set of detection positions on one inspection plane.

The ratio calculation unit 7*a* calculates, for each of one set of detection positions, a ratio of the number of detected exit neutrons at the detection position to a reference value. When the inspection object 1 is inspected for a defect that may exist inside the inspection object 1, the reference value may be set as the number of detected exit neutrons in an assumed case where no defects exist in the inspection object 1. In this case, the reference value may vary depending on the detection positions. When the inspection object 1 is inspected for a state of fluid existing in the inside space of the inspection object 1, the reference value may be set as the number of detected exit neutrons in an assumed case where the entire inside space is in a uniform state (e.g., a state in which the entire inside space is air or a state in which the entire inside space is filled with the above-mentioned fluid). Even in this case, the reference value may vary depending on the detection positions.

The reconstruction unit 7*b* generates the reconstructed cross-sectional data by performing the reconstruction processing on the respective ratios at one set of detection positions. In the reconstruction processing, the reconstruction unit 7*b* transforms the above-described respective ratios of one set of detection positions into neutron reaction rates at a plurality of two-dimensional coordinates on the imaginary cross-section associated with one set of detection positions.

When the three-dimensional internal data are generated, the ratio calculation unit 7*a* and the reconstruction unit 7*b* perform the above-described processing for each of one set of detection positions associated with each of a plurality of the inspection planes. In this case, the three-dimensional data generation unit 7*c* generates the above-described three-dimensional internal data, based on a plurality of pieces of the reconstructed cross-sectional data that are generated by the ratio calculation unit 7*a* and the reconstruction unit 7*b* and that are associated with a plurality of the respective inspection planes.

<Method of Setting Reference Value>

The above-described reference value may be preset for each detection position in the detection unit 5*a*, for the inspection object 1 in a reference state. When the inspection object 1 is inspected for a defect that may exist inside the inspection object 1, the reference state may be a state in which a defect does not exist inside the inspection object 1. When the inspection object 1 is inspected for a state of the fluid existing in an inside space of the inspection object 1, the reference state may be a state in which the entire inside space is uniform as described above (e.g., a state in which the entire inside space is air or a state in which the entire inside space is filled with the fluid).

More specifically, the reference values may be set as follows. Under the following detection conditions (a) and (b), neutrons are emitted to the inspection object 1 in the reference state for a set emission duration to perform inspection. In this case, the number of neutrons detected at each of detection positions on the inspection plane over a set measurement duration may be acquired by an experiment, simulation, or the like as described below and may be set as the reference value of the detection position. An end point of the set measurement duration may be a point after an end point of the above-mentioned set emission duration. In a case of emitting the pulsed neutron beam, the pulsed neutron beam may be intermittently emitted to the inspection object 1 over the above-mentioned set emission duration.

(a) A positional relation and a posture relation (orientation relation) among the detection unit 5*a*, the inspection object 1, and the neutron emission device 3 are set as predetermined positional relation and posture relation.

(b) A spectrum of the neutrons emitted by the neutron emission device 3 to the inspection object 1 is set as a predetermined spectrum. The spectrum of the neutrons is an energy distribution of a large number of neutrons emitted by the neutron emission device 3 to the inspection object 1 over the above-mentioned set emission duration. For each of energy values, this distribution indicates the number of neutrons each having the energy value.

In one example, the inspection experiment is performed on a plurality of inspection objects 1 having the same structure (e.g., a material, a shape, a dimension, and the like). These inspection objects 1 may be assumed to be in the reference state (e.g., assumed to have a low probability of existence of a defect). The inspection experiment is performed for each of these inspection objects 1. In the inspection experiment, under the above-mentioned detection conditions (a) and (b), the neutron emission device 3 emits the neutrons to the inspection object 1, and the detection device 5 measures the number of detected exit neutrons at each detection position. An average value of a plurality of the numbers of the detected exit neutrons at each of the detection positions, which are acquired for a plurality of the inspection objects 1 at the detection position, is set as the reference value of the detection position.

In another example, a specimen having the same structure as the actual inspection object 1 but being in the reference state (e.g., a state of including no defects) is prepared, and the inspection experiment is performed on this specimen. In the inspection experiment, under the above-mentioned detection conditions (a) and (b), the neutron emission device 3 emits the neutrons to the specimen, and the detection device 5 measures the number of detected exit neutrons at each detection position, and the number of the detected exit neutrons is set as the reference value at the detection position.

In still another example, the simulation acquires the number of exit neutrons incident on each detection position in the detection unit 5*a* when the inspection object 1 in the reference state is inspected under the above-mentioned detection conditions (a) and (b). The thus-acquired number is set as the reference value at the detection position.

The reference value at each detection position may be stored in a storage unit 7*d* of the data processing device 7. In this case, the ratio calculation unit 7*a* may use the reference value of the storage unit 7*d* at the time of calculating the above-described ratio at each detection position.

(Cross-Sectional Image Acquisition Method)

Figure 3:
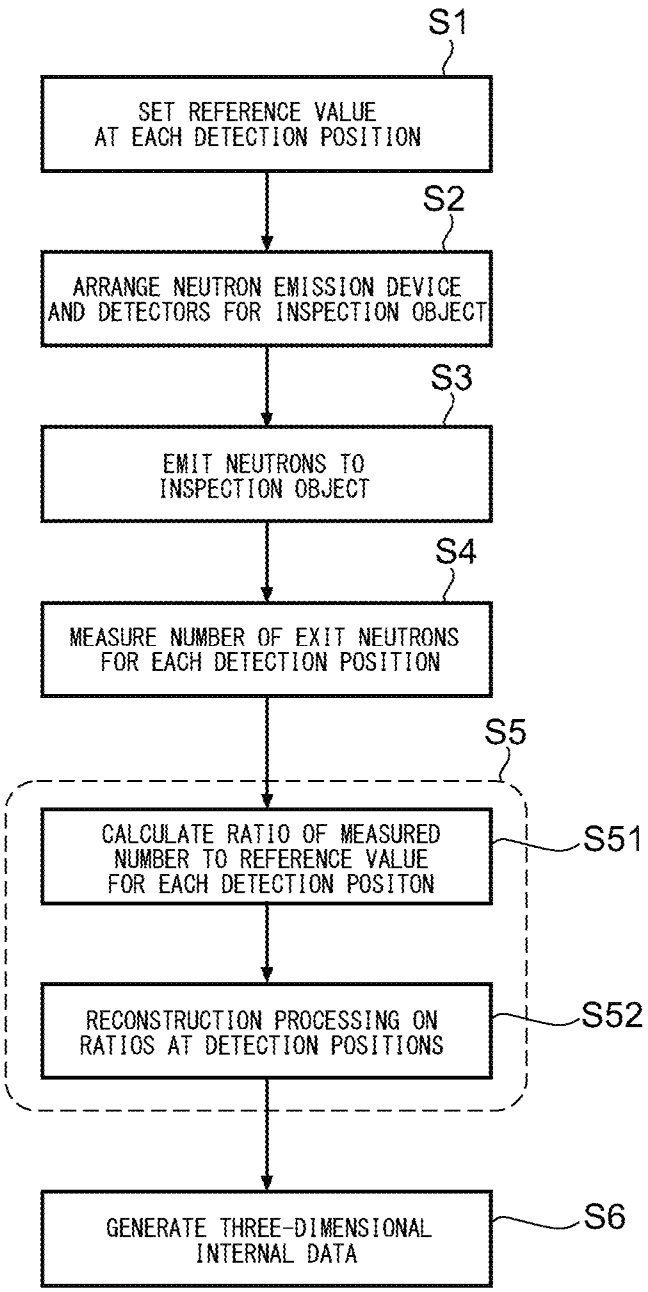
FIG. 3 is a flowchart illustrating a cross-sectional image acquisition method according to the embodiment of the present invention.

FIG. 3 is a flowchart illustrating the cross-sectional image acquisition method according to the embodiment of the present invention. This method is performed using the above-described observation device 10.

<Generation of Reconstructed Cross-Sectional Data>

In the cross-sectional image acquisition method according to the present embodiment, steps S1 to S5 are performed to generate the reconstructed cross-sectional data.

at the step S1, the reference value at each detection position of the detection unit 5*a* is set as described above and stored in the storage unit 7*d*.

At the step S2, the neutron emission device 3 and the detection unit 5*a* are arranged in relation to the inspection object 1. This arrangement is performed to satisfy the above-mentioned detection condition (a).

At the step S3, the neutron emission device 3 emits the neutrons to the inspection object 1. In this case, a duration for emitting the neutrons to the inspection object 1 is the same as the above-mentioned set emission duration used in setting the reference value.

At the step S4, the detection unit 5*a* detects, at each of one set of detection positions, the exit neutrons that exit from the inspection object 1 as a result of the step S3, and the measurement unit 5*b* measures the number of the detected exit neutrons at each of one set of detection positions, over the set measurement duration. This set measurement duration is the same as the above-mentioned set measurement duration used in setting the reference value. The set measurement duration is within a range equal to or longer than 10 seconds and equal to or shorter than 10 minutes in one example. However, there is no limitation to this range. The steps S3 and S4 are performed under the above-described detection conditions (a) and (b).

At the step S5, the data processing device 7 performs the reconstruction processing based on the number of the detected exit neutrons at each of one set of detection positions measured at the step S4, and thereby generates the reconstructed cross-sectional data. In the present embodiment, the step S5 includes a step S51 and a step S52.

At the step S51, the ratio calculation unit 7*a* calculates, for each of one set of detection positions in the detection unit 5*a*, a ratio of the number of the detected exit neutrons at the detection position to the reference value of the detection position. This calculation is performed based on the reference value at each detection position set at the step S1 and the number of the detected exit neutrons at each detection position measured at the step S4.

At the step S52, the reconstruction unit 7*b* performs the reconstruction processing to generate the reconstructed cross-sectional data. In other words, the reconstruction unit 7*b* transforms a plurality of the ratios calculated at the step S51 for one set of detection positions, into neutron reaction rates at a plurality of the two-dimensional coordinates in the imaginary cross-section. Thus, the reconstruction unit 7*b* generates the reconstructed cross-sectional data indicating the neutron reaction rate in each two-dimensional coordinate on the imaginary cross-section.

The reconstruction unit 7*b* may store the acquired reconstructed cross-sectional data in the storage unit 7*e* of the data processing device 7. The data processing device 7 may output the reconstructed cross-sectional data generated by the reconstruction unit 7*b* to an outside destination. The output destination may be a display 9, for example. The display 9 displays the reconstructed cross-sectional data output from the data processing device 7. For example, the display 9 displays, as the reconstructed cross-sectional data, a coordinate system representing the two-dimensional coordinates in the imaginary cross-section, and the neutron reaction rate at each of the two-dimensional coordinates, as in the reconstructed cross-sectional data of FIG. 9A to FIG. 9C described below. Here, the neutron reaction rate may be expressed by color, shading, or the like. The display 9 may be a constituent of the observation device 10.

<Generation of Three-Dimensional Internal Data>

In the cross-sectional image acquisition method according to the present embodiment, in a case of generating the three-dimensional internal data, the above-described steps S4 and S5 are performed for each of a plurality of inspection planes. In other words, in the case of generating the three-dimensional internal data, the steps S1 to S5 are performed, but the steps S1, S4, and S5 are performed as follows. Further, the below-described step S6 is performed. The matters not described below may be the same as described above.

The steps S1, S4, and S5 are performed for each of a plurality of the inspection planes whose positions in the direction of the reference line L are different from each other. At the step S1, for each of the inspection planes, the reference value is set as described above for each of one set of detection positions on the inspection plane. At the step S4, for each of the inspection planes, the detection unit 5*a* detects the exit neutrons from the inspection object 1 at each of one set of detection positions on the inspection plane, and the measurement unit 5*b* measures the number of the detected exit neutrons at each of one set of detection positions.

At the step S5, for each of the inspection planes, the data processing device 7 generates the reconstructed cross-sectional data by performing the reconstruction processing, based on the number of detected exit neutrons at each of one set of detection positions on the inspection plane measured at the step S4.

In other words, at the steps S51 and S52 are performed for one set of detection positions on each of the inspection planes. At the step S51, for each of the inspection planes, the ratio calculation unit 7*a* calculates, for each of one set of detection positions on the inspection plane, a ratio of the number of the detected exit neutrons at the detection position to the reference value at the detection position. At the step S52, for each of the inspection planes, the reconstruction unit 7*b* transforms a plurality of the ratios calculated at the step S51 for one set of detection positions on the inspection plane into the neutron reaction rates at a plurality of the two-dimensional coordinates on the associated imaginary cross-section. Thereby, the reconstruction unit 7*b* generates the reconstructed cross-sectional data expressing the neutron reaction rate at each of the two-dimensional coordinates on the associated imaginary cross-section for each of the inspection planes.

At the step S6, the three-dimensional data generation unit 7*c* generates the above-described three-dimensional internal data from the reconstructed cross-sectional data on each of the inspection planes generated at the step S5.

<Details of Reconstructed Cross-Sectional Data Generation>

The step S52 of generating the reconstructed cross-sectional data includes steps Sa to Sc described below. Processing is performed in the order of the steps Sa to Sc.

At the step Sa, the data processing device 7 generates the first two-dimensional image data from the ratio at each of one set of detection positions. The first two-dimensional image data are configured from each of the above-described ratios as follows.

First, a pixel value indicating the ratio at each of one set of detection positions arranged in order in the peripheral direction is defined as $C_i$. Here, it is assumed that i is the identification number of each of a plurality of the detection elements (detectors 15) constituting the detection unit 5*a*. A plurality of the detection elements i corresponds to one set of detection positions determined in the detection unit 5*a*. A value of i is an integer ranging from 0 to N−1. A value of N is the total number of one set of detection elements i (the same applies hereinafter). One set of detection elements is continuously arranged in the peripheral direction in the order of i=0 to N−1.

Figure 4A:
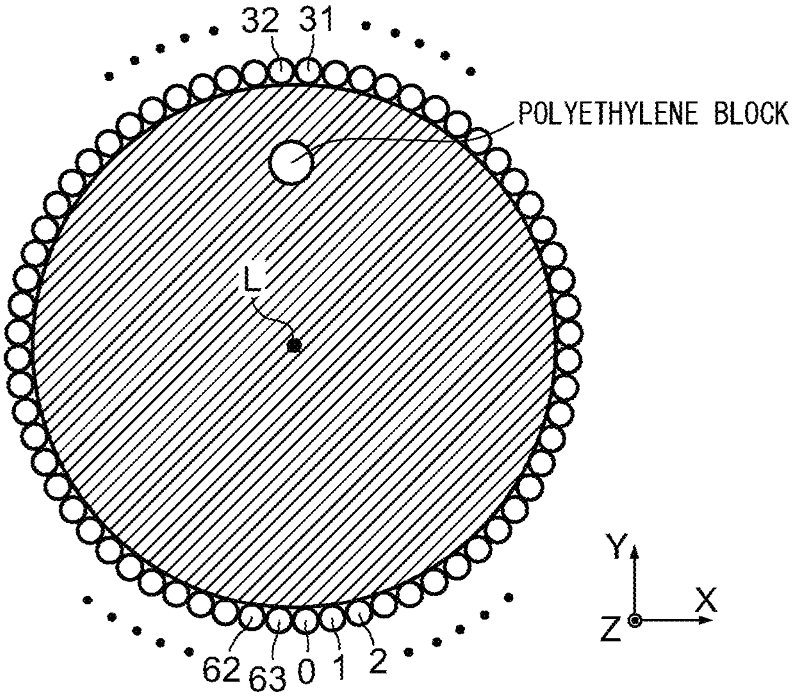
FIG. 4A illustrates a cross-section of an inspection object in which a stagnant-water spot as a defect is simulated by a polyethylene block.

FIG. 4A illustrates identification numbers i=0 to 63 of one set of detection elements (detectors 15) in the case of N=64. FIG. 4A illustrates a cross-section of the inspection object 1 in FIG. 1, and illustrates a polyethylene block simulating a stagnant-water spot in the inspection object 1. Since a hydrogen density of polyethylene is substantially the same as a hydrogen density of water, polyethylene can be regarded as water. In FIG. 4A, the inspection object 1 is formed of steel.

Figure 4B:
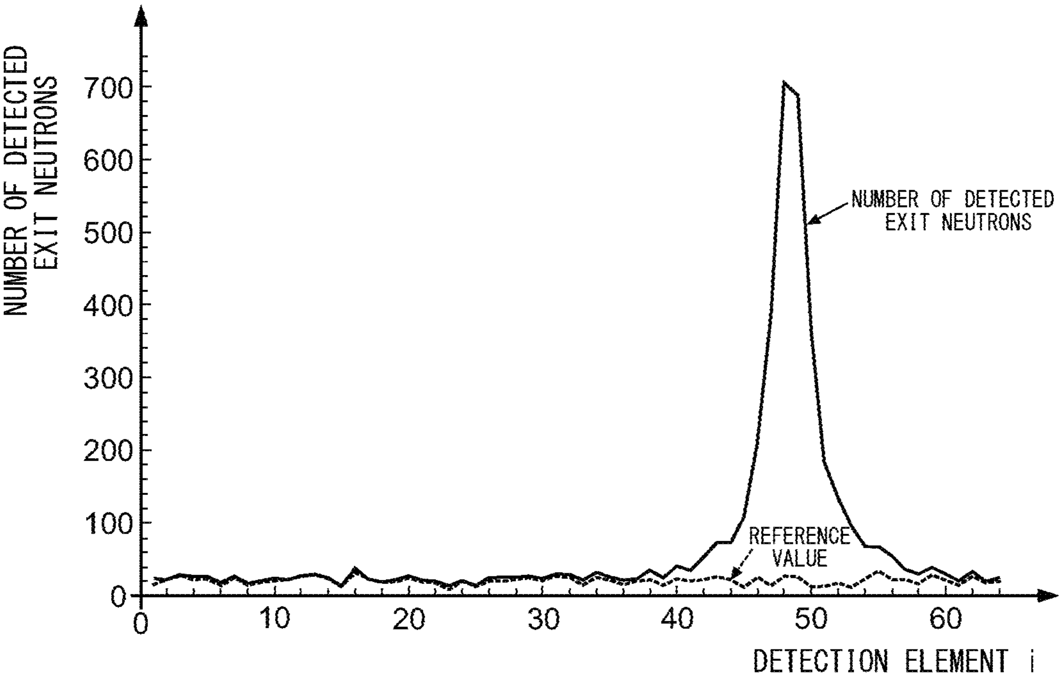
FIG. 4B illustrates the number of exit neutrons detected in the case of FIG. 4A.

FIG. 4B illustrates a simulation result of the number of detected exit neutrons at each detection element i (detector 15) when the detector 15 detects the neutron having energy equal to or lower than 100 eV in the case of FIG. 4A. In FIG.

4B, the horizontal axis indicates the identification number i=0 to 63 of the detection element i (detector 15), and the vertical axis indicates the number of detected exit neutrons and a reference value. In FIG. 4B, the solid line data indicates the number of detected exit neutrons, and the broken line data indicates a reference value.

The signs $C_0$ to $C_{N-1}$ are defined as pixel values expressing ratios at the detection elements i=0 to 63, respectively. One-dimensional image data are defined as image data in which $C_0$ to $C_{N-1}$ are arranged in a first direction (e.g., an up-down direction) in this order. First two-dimensional image data are defined as image data in which a plurality of pieces of the one-dimensional image data are arranged in a second direction (e.g., a left-right direction) intersecting with (e.g., perpendicular to) the first direction. The sign M is defined as the number of the pieces of the one-dimensional image data constituting the first two-dimensional image data (the same applies hereinafter). A value of M may be the same as or different from N. For example, M may be the number of the detection elements i existing in a range equal to or smaller than a half periphery in the peripheral direction. In one example, M may be M=N/2.

In the first two-dimensional image data, each of the pieces of the one-dimensional image data excluding the most front one-dimensional image data in the second direction is data (e.g., data in FIG. 5 described below) in which, in the direction of circulating the pixels in the first direction, the pixels of $C_0$ to $C_{N-1}$ are shifted by a predetermined shift amount from those of the different one-dimensional image data (simply referred to as adjacent one-dimensional image data) adjacent to the present one-dimensional image data from a front side (e.g., the left side) in the second direction. More specifically, in the first two-dimensional image data, each of the pieces of the one-dimensional image data excluding the most front one-dimensional image data in the second direction is data whose rear end part in the first direction is a front end part (e.g., an upper end portion) of the adjacent one-dimensional image data in the first direction and whose front-side part is the remaining entire part of the adjacent one-dimensional image data excluding the front end part and shifted to a front side in the first direction by the predetermined shift amount (the details are described below with reference to FIG. 5). Here, the front end part of the adjacent one-dimensional image data in the first direction corresponds to the predetermined shift amount.

The predetermined shift amount may be the same for all pieces of the one-dimensional image data constituting the first two-dimensional image data. The predetermined shift amount may be the same amount as a first-direction dimension of a pixel of one pixel value $C_i$ (the subscript indicates the above identification number of the detection element i), may be an amount smaller than the first-direction dimension, or may be an amount larger than the first-direction dimension. When the predetermined shift amount is smaller than or larger than the first-direction dimension, an apparent spatial resolution of the reconstructed two-dimensional cross-sectional image is improved or decreased.

When the predetermined shift amount is the same amount as the first-direction dimension of one pixel of $C_i$, the first two-dimensional image data can be represented by the following Expression (1). In Expression (1), $T_{i,j}$ indicates a pixel value of a pixel that is included in the first two-dimensional image data, whose row number is i, and whose line number is j.

$$T_{i,j} = \{C_k \mid i + j = k \bmod N\} \tag{1}$$

In $T_{i,j}$, i is the identification number of the detection element as described above, and takes an integer of 0 to N−1. In $T_{i,j}$, the sign j indicates the identification number of the one-dimensional image data arranged in the second direction, and takes an integer of 0 to M−1. In addition, i+j=k mod N indicates that the remainder of an integer when i+j is divided by Nis k. In other words, for $T_{i,j}$, on the assumption that k is the remainder of the integer when i+j is divided by N, $T_{i,j}$ is $C_k$. A value of $C_k$ is the above-described pixel value $C_i$ in a case of k=i.

Here, the first two-dimensional image data can be expressed by a matrix T. In this case, the matrix T includes the element $T_{i,j}$ of T. The row number of $T_{i,j}$ is i and the line number of $T_{i,j}$ is j, as expressed in the above-mentioned Expression (1). Accordingly, for example, in a case of N=64 and M=32, the matrix T is expressed by Expression (2) in [Formula 1].

[Formula 1]

$$T = \begin{pmatrix} C_0 & C_1 & C_2 & \dots & C_{30} & C_{31} \\ C_1 & C_2 & C_3 & \dots & C_{31} & C_{32} \\ C_2 & C_3 & C_4 & \dots & C_{32} & C_{33} \\ C_3 & C_4 & C_5 & \dots & C_{33} & C_{34} \\ \vdots & \vdots & \vdots & & \vdots & \vdots \\ C_{61} & C_{62} & C_{63} & \dots & C_{27} & C_{28} \\ C_{62} & C_{63} & C_0 & \dots & C_{28} & C_{29} \\ C_{63} & C_0 & C_1 & \dots & C_{29} & C_{30} \end{pmatrix} \tag{2}$$

Figure 5:
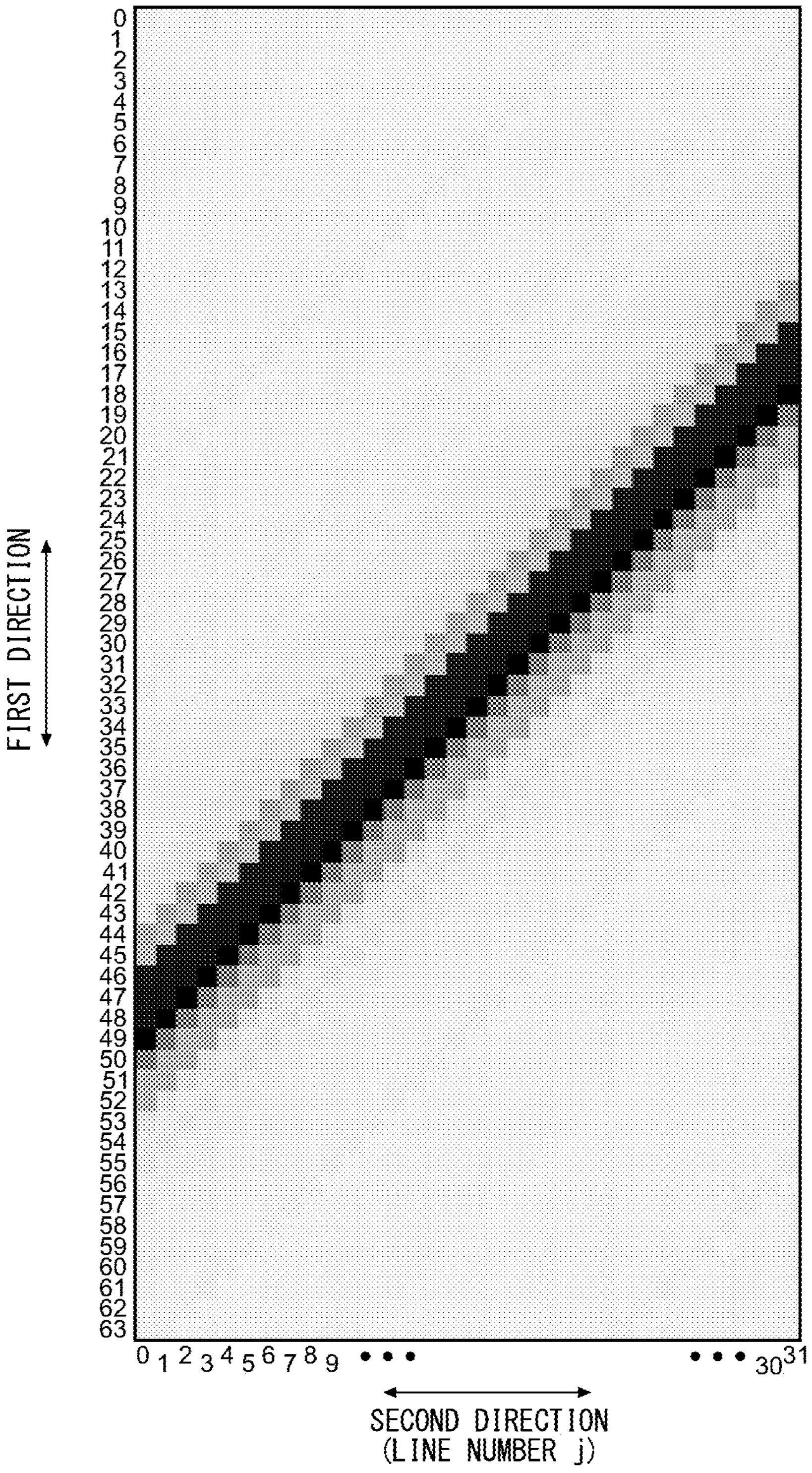
FIG. 5 illustrates first two-dimensional image data generated from the data of FIG. 4B.

FIG. 5 illustrates the first two-dimensional image data generated from the numbers of the detected exit neutrons and the reference values in FIG. 4B. As illustrated in FIG. 5, the first two-dimensional image data may be image data in which the pixels are arranged in a rectangular shape in N rows and M lines. In FIG. 5, the pixel value (the above-mentioned ratio) is expressed by the shading of the pixel in each of the pixels in the rectangular frame. In other words, the larger ratio is expressed by a darker color of the pixel. In FIG. 5, the up-down direction is the first direction, and the left-right direction is the second direction. The first two-dimensional image in FIG. 5 is expressed by the matrix T of the above Expression (2). The numbers arranged up and down on a left side of the rectangular frame are the pixel numbers, and the numbers arranged left and right on a lower side of the rectangular frame are the identification numbers j of the one-dimensional image data arranged in the second direction.

At the step Sb, the data processing device 7 generates second two-dimensional image data that are data extracted from the first two-dimensional image data, over a continuous range in the first direction corresponding to a range along the periphery around the inspection object 1 and equal to or shorter than half of the periphery around the inspection object 1. The data processing device 7 may generate the second two-dimensional image data from the ratio of each of one set of detection elements i without generating the first two-dimensional image data (i.e., without performing the step Sa). The above-mentioned continuous range in the first direction corresponds to, for example, half of the periphery of the inspection object 1 (e.g., corresponds to N/2 pixels continuous in the first direction).

When the first two-dimensional image data are expressed by $T_{i,j}$ of the above Expression (1), the second two-dimensional image data can be expressed by the following Expression (3). In Expression (3), $S_{p,j}$ indicates a pixel value of a pixel included in the second two-dimensional image data, whose row number is p, and whose line number is j.

$$S_{p,j} = \{C_k \mid p + r + j = k \bmod N\} \tag{3}$$

In $S_{p,j}$, the sign p takes an integer of 0 to Q−1, the sign j takes an integer of 0 to M−1, and r is the first number of the above-mentioned continuous range in the first direction. In $S_{p,j}$, the sign $C_k$|p+r+j=k mod N indicates that a remainder of an integer when p+r+j is divided by Nis k. In other words, for $S_{p,j}$, on the assumption that k is the remainder of the integer when p+r+j is divided by N, $S_{p,j}=C_k$. A value of $C_k$ is the above-described pixel value $C_i$ in a case of k=i.

Here, the second two-dimensional image data can be expressed by a matrix S. In this case, the matrix S includes the element $S_{p,j}$ of S. The row number of $S_{p,j}$ is p, and the line number of $S_{p,j}$ is j, as expressed in the above-described Expression (3). Accordingly, for example, in a case of N=64, M=32, r=16, and Q=32, the matrix S is expressed by Expression (4) in [Formula 2].

[Formula 2]

$$S = \begin{pmatrix} C_{16} & C_{17} & C_{18} & \cdots & C_{46} & C_{47} \\ C_{17} & C_{18} & C_{19} & \cdots & C_{47} & C_{48} \\ C_{18} & C_{19} & C_{20} & \cdots & C_{48} & C_{49} \\ C_{19} & C_{20} & C_{21} & \cdots & C_{49} & C_{50} \\ \vdots & \vdots & \vdots & & \vdots & \vdots \\ C_{45} & C_{46} & C_{47} & \cdots & C_{11} & C_{12} \\ C_{46} & C_{47} & C_{48} & \cdots & C_{12} & C_{13} \\ C_{47} & C_{48} & C_{49} & \cdots & C_{13} & C_{14} \end{pmatrix} \tag{4}$$

Figure 6A:
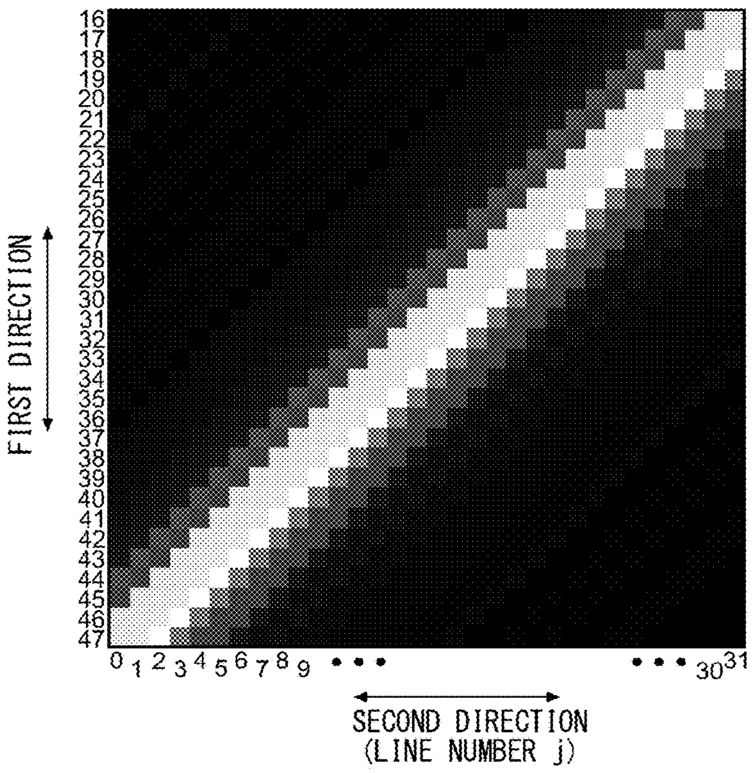
FIG. 6A illustrates second two-dimensional image data acquired by extracting a part in FIG. 5.

FIG. 6A illustrates the second two-dimensional image data extracted from the first two-dimensional image data in FIG. 5, over the above-described continuous range (the range of the row number i=16 to 47 in the matrix T). In each pixel of FIG. 6A, the shading is reversed from that FIG. 5. In other words, in each pixel of FIG. 6A, the pixel value (the above ratio) is expressed by the shading of the pixel. In other words, the larger ratio is expressed by a lighter color of the pixel. In FIG. 6A, the up-down direction is the first direction, and the left-right direction is the second direction. The second two-dimensional image data of FIG. 6A is expressed by the matrix S of the above Expression (4). In FIG. 6A, the numbers (16 to 47) arranged up and down on a left side of the two-dimensional image data are the pixel numbers, and the numbers (0 to 31) arranged left and right on a lower side of the two-dimensional image data are the identification numbers j of the one-dimensional image data arranged in the second direction. In FIG. 6A, the numbers 16 to 47 arranged up and down correspond to the row numbers p=0 to 31 of the matrix S.

In the present embodiment, at the step Sc, the data processing device 7 may perform the coordinate transformation on the second two-dimensional image data and may perform the reconstruction processing on the data after the coordinate transformation to generate the reconstructed cross-sectional data. The details are as follows.

It is assumed that the second two-dimensional image data are data S(j, p) representing the pixel value at each coordinate (j, p) in a jp coordinate system. The jp coordinate system is a two-dimensional coordinate system having a j-coordinate axis directed to the second direction and a p-coordinate axis directed to the first direction. For the coordinates (j, p), j indicates a j-axis coordinate and p indicates a p-axis coordinate. Here, j takes a value of 0 to M, and represents pixels at a j-th line in the second two-dimensional image data (the pixels of the line number j may occupy a coordinate range in which the j-axis coordinate is equal to or larger than j and smaller than j+1). Further, p takes a value from 0 to Q, and indicates pixels at a p-th row in the second two-dimensional image data (the pixels of the row number p may occupy a coordinate range in which the p-axis coordinate is equal to or larger than p and smaller than p+1).

The data processing device 7 coordinate-transforms S(j, p) in the jp coordinate system into the transformed data F(x, y) by the following Expressions (5) and (6).

$$x = j/M \tag{5}$$

$$y = \alpha\cos(\pi \times p/Q) \tag{6}$$

Here, F(x, y) represents a value (pixel value) at each coordinate (x, y) in an xy coordinate system. The xy coordinate system is a two-dimensional coordinate system having an x-coordinate axis and a y-coordinate axis. For coordinates (x, y), x indicates an x-axis coordinate and y indicates a y-axis coordinate. In Expression (6), the number of the detection elements i that are among one set of detection elements i (detectors 15) arranged at equal intervals in the peripheral direction and that exist in a range over half of the periphery in the peripheral direction may be Q.

In addition, x takes a value of 0 to 1, and x=j/M indicates pixels at the j-th line in the second two-dimensional image data (the pixels of the line number j may occupy a coordinate range in which the x-axis coordinate is equal to or larger than j/M and is smaller than (j+1)/M). Further, y for p=0 to Q takes a range of −α to α, and y=a cos (xx p/Q) indicates pixels at the p-th row in the second two-dimensional image data (the pixels of the row number p may occupy a coordinate range in which the y-axis coordinate is equal to or larger than a cos (π×p/Q) and smaller than a cos {π×(p+1)/Q}).

In addition, a is a preset coefficient. For example, α is a coefficient whose absolute value is equal to or smaller than 1 and larger than 0. In this case, α may be set depending on a detection field of view (angle of view) of the detector 15, and in one example, α is ¼.

Figure 6B:
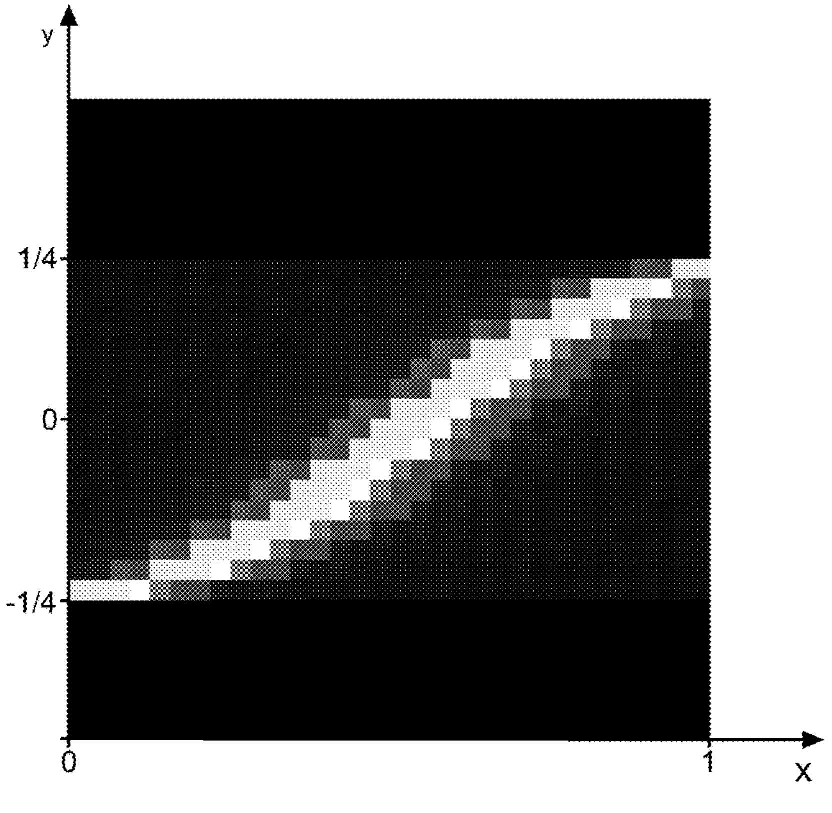
FIG. 6B illustrates image data acquired by performing coordinate transformation on the second two-dimensional image data illustrated in FIG. 6A.

FIG. 6B illustrates F(x, y) in the xy coordinate system acquired by coordinate-transforming the second two-dimensional image data S(j, p) of FIG. 6A by using the above Expressions (5) and (6). FIG. 6B illustrates a case of α=¼. In FIG. 6B, a pixel value of zero is set as a blank in a range where the absolute value of the y-axis coordinate is ¼ to ½.

A factor of cos (π×p/Q) is based on the directivity of each of the detectors 15 arranged at equal intervals on the periphery. The orientation of each detector 15 is a direction toward the reference line L from the detector 15. In other words, in the inspection plane (FIG. 4A), each detector 15 just faces the reference line L. The pixel value $C_k$ (p+r+j=k mod N) whose line number is j in the above-described matrix S is regarded as data related to the flight direction j of the neutron corresponding to the line j. This is described below with reference to FIGS. 7A and 7B.

Figure 7A:
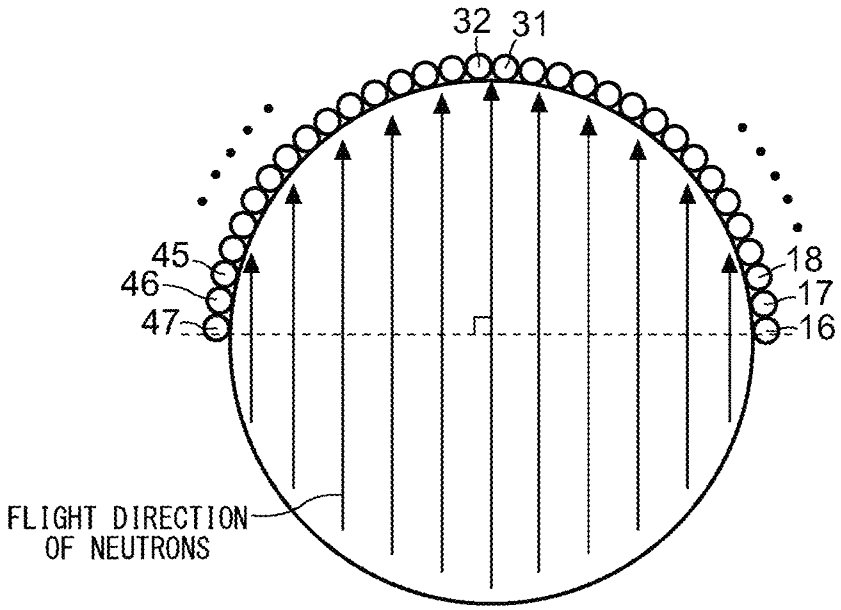
FIG. 7A is an illustration of the neutron detection at detection positions i=16 to 47 corresponding to a plurality of pixels whose line number j is 0 in the second two-dimensional image data of FIG. 6A.

FIG. 7A is an illustration of the neutron detection at the detection elements i=16 to 47 corresponding to a plurality of the pixels whose line number j is 0 in the second two-dimensional image data of FIG. 6A. In FIG. 5 and the above Equation (4), the pixel values $C_{16}$ to $C_{47}$ of a plurality of the pixels at the line number j of 0 are the individual pixel values (the above ratios or the values indicating the above ratios) at the detection elements i=16 to 47 in FIG. 7A. The data $C_{16}$ to $C_{47}$ at the line j=0 are data related to the flight direction j=0. The flight direction j=0 is a direction perpendicular to a line segment (broken line in FIG. 7A) connecting the first detection element i=16 and the last detection element i=47 among the detection elements i=16 to 47 in FIG. 7A.

Figure 7B:
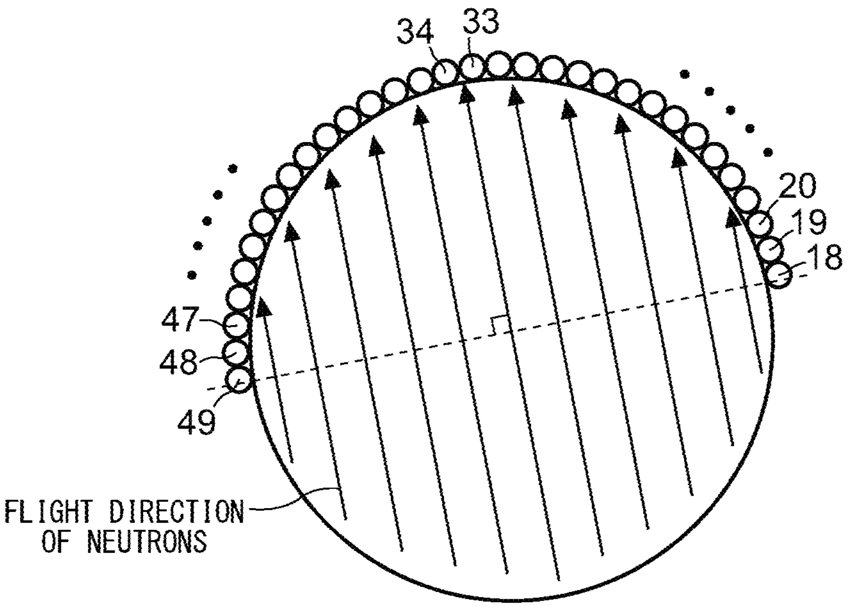
FIG. 7B is an illustration of the neutron detection at the detection positions i=18 to 49 corresponding to a plurality of the pixels whose line number j is 2 in the second two-dimensional image data of FIG. 6A.

Similarly, FIG. 7B is an illustration of the neutron detection at the detection elements i=18 to 49 corresponding to a plurality of the pixels whose line number j is 2 in the second two-dimensional image data of FIG. 6A. In FIG. 5 and the above Expression (4), the pixel values $C_{18}$ to $C_{49}$ of a plurality of the pixels at the line number j of 2 are the individual pixel values (the above ratios or the values indicating the above ratios) at the detection elements i=18 to 49 in FIG. 7B. The data $C_{18}$ to $C_{49}$ at the line j=2 are data related to the flight direction j=2. In FIG. 7B, the flight direction j=2 is a direction perpendicular to a line segment (broken line in FIG. 7B) connecting the first detection element i=18 and the last detection element i=49 among the detection elements i=18 to 49.

A set effective detection area of the detector 15 (detection element i) for the flight direction of the neutrons is an area that depends on the orientation of the detector 15 with respect to the flight direction, due to the directivity (collimator) of the detector 15. Assuming that the set effective detection area of the detector 15 just facing in the flight direction is 1, the set effective detection area of each detector 15 is cos θ in a case of an angle θ between the orientation of the detector 15 and a direction opposite to the flight direction. In the case of FIG. 7A, the set effective detection areas of the detectors 15 (detection elements i) of i=16 and 47 are 0, and the set effective detection areas of the detectors 15 (detection elements i) of i=31 and 32 each have a value close to 1. Similarly, in the case of FIG. 7B, the set effective detection areas of the detectors 15 (detection elements i) of i=18 and 49 are 0, and the set effective detection areas of the detectors 15 (detection elements i) of i=33 and 34 each have a value close to 1.

In this manner, for the second two-dimensional image data S(j, p), the pixel value of each coordinate p at each coordinate j is regarded as a pixel value based on the number of detected exit neutrons in the set effective detection area depending on the coordinate p, for the neutrons from the flight direction j corresponding to the coordinate j. In correspondence with this, cos (π×p/Q) is used in the coordinate transformation y=a cos (π×p/Q) depending on the set effective detection area of the detector 15 for the flight direction.

The data processing device 7 generates the reconstructed cross-sectional data by performing the reconstruction processing on F(x, y), by using, as a sinogram, the transformed data F(x, y) generated as described above.

Figure 8A:
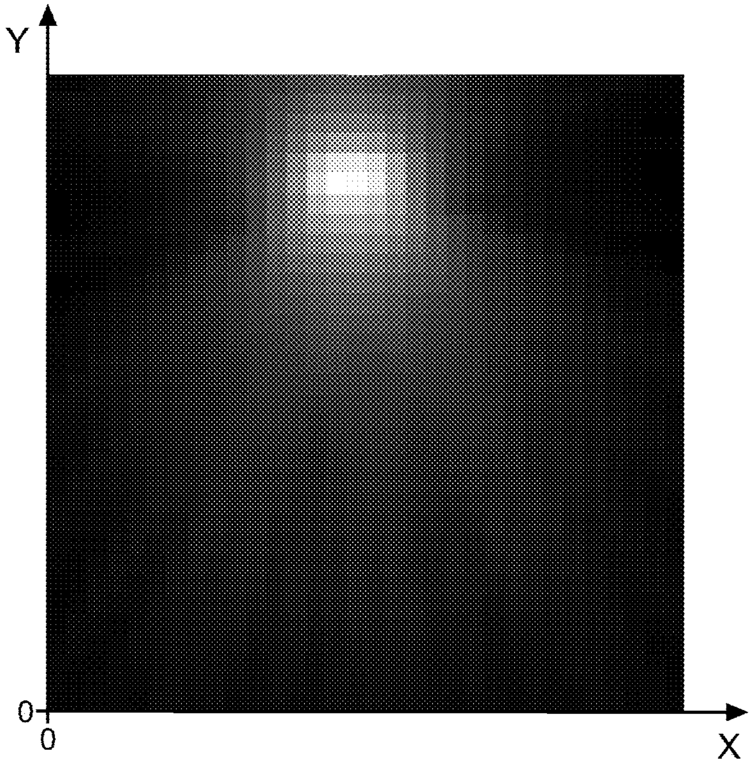
FIG. 8A illustrates reconstructed cross-sectional data acquired by performing reconstruction processing on the data of FIG. 6B.

FIG. 8A illustrates reconstructed cross-sectional data generated by performing the reconstruction processing on the transformed data F(x, y) of FIG. 6B. In other words, FIG. 8A is the reconstructed cross-sectional data (image data) generated from the data of FIG. 6B. FIG. 8A is the reconstructed cross-sectional data when a polyethylene block as a small stagnant-water spot exists at a shallow position as in FIG. 4A. This polyethylene block has a cylindrical shape, and has the diameter and the thickness that are 1 cm. The polyethylene block is positioned at a depth of 1.25 cm from the surface of the inspection object 1. In FIG. 8A, the left-right direction and the up-down direction are the X-axis direction and the Y-axis direction in FIG. 4A, respectively. The center of the image of FIG. 8A is the position of the reference line L in the cross-section of the inspection object 1 in FIG. 4A.

Figure 8B:
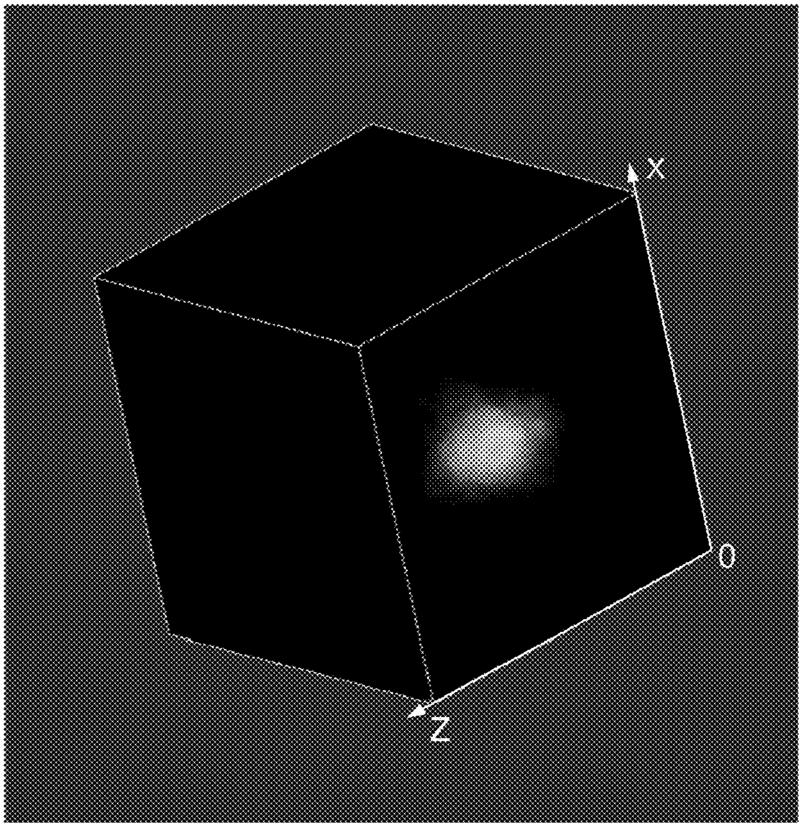
FIG. 8B illustrates three-dimensional internal data generated from a plurality of pieces of reconstructed cross-sectional data acquired for a plurality of inspection planes in the inspection object of FIG. 4A.

FIG. 8B illustrates the three-dimensional internal data generated from a plurality of pieces of the reconstructed cross-sectional data generated as described above for a plurality of the inspection planes in the inspection object 1 in FIG. 4A. In FIG. 8B, the above-mentioned ratio is expressed in the XYZ coordinate system. In other words, in FIG. 8B, the shading inside a cube indicates the neutron reaction rate, and the neutron reaction rate is larger at a position where the shading is lighter. In FIG. 8B, the X axis and the Z axis correspond to the X axis and the Z axis in FIG. 4A.

Figure 8C:
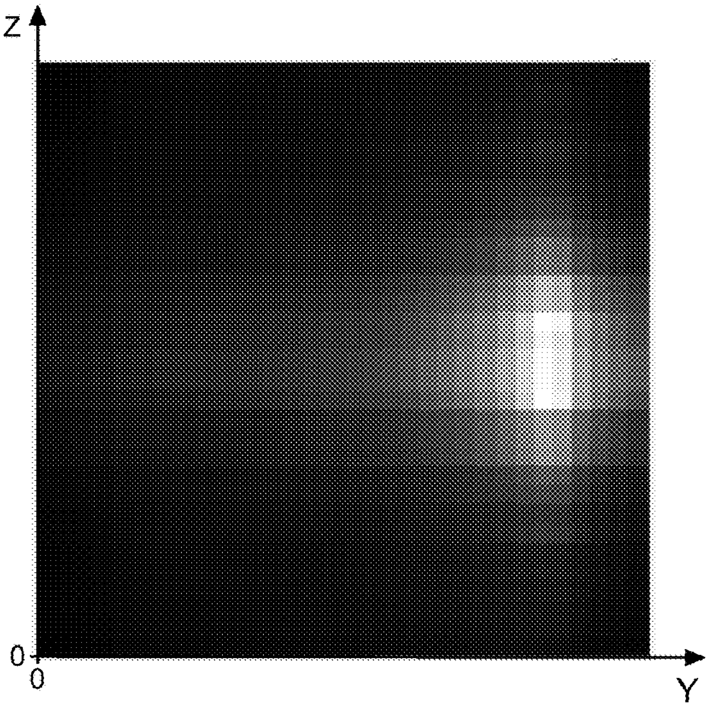
FIG. 8C is image data of a YZ cross-section at X=159 in FIG. 8B.

The above-described FIG. 8A corresponds to an XY cross-section at the Z coordinate in which the polyethylene block exists in FIG. 8B. FIG. 8C corresponds to a YZ cross-section at the X coordinate at which the polyethylene block exists in FIG. 8B.

Examples that can be used as the reconstruction processing in the present application include a known filtered back projection (FBP). Thus, the reconstruction processing is well known, and for this reason, the detailed description of the reconstruction processing is omitted.

Advantageous Effects of Embodiment

As a result of the emission of neutrons to the inspection object 1, the exit neutrons fly from the inspection object 1. The exit neutrons are detected at one set of detection positions in the peripheral direction around the inspection object 1. The number of the exit neutrons detected at each of one set of detection positions is measured as the measured number. Then, the reconstruction processing is performed based on the number of the detected exit neutrons at one set of detection positions to generate the reconstructed cross-sectional data. The reconstructed cross-sectional data represent a two-dimensional distribution of a neutron reaction rate on the imaginary cross-section inside the inspection object 1. In a case of inspecting a defect of the inspection object 1, the neutron reaction rate is different between a normal position and a defect position in the imaginary cross-section. Thus, the position and an existing range of the defect in the imaginary cross-section can be two-dimensionally recognized from the two-dimensional distribution of a neutron reaction rate expressed by the reconstructed cross-sectional data. More details are as follows.

When a portion having a higher or lower neutron reaction rate than those of other portions is included within a range expected to be originally made of the same uniform material in the imaginary cross-section expressed by the reconstructed cross-sectional data, the portion can be regarded as a defect portion due to deterioration, improper initial construction, or the like. In other words, the two-dimensional coordinates representing the portion are can be regarded as positions of the defect. Thus, the reconstructed cross-sectional data represent the two-dimensional coordinate of the defect position in the cross-section of the inspection object 1.

When a void exists as a defect in the inspection object 1, a neutron reaction rate in a portion of the void is lower than neutron reaction rates in other portions in the imaginary cross-section represented by the reconstructed cross-sectional data.

When a stagnant-water portion exists as a defect in the inspection object 1, the neutrons easily react with hydrogens of the stagnant-water portion (are elastically scattered by hydrogen atomic nuclei) to be decelerated. Accordingly, the detection unit 5*a* may be configured to selectively detect neutrons (e.g., thermal neutrons) each having an energy lower than the above-mentioned predetermined value. In this case, in the cross-section represented by the reconstructed cross-sectional data, a neutron reaction rate in the stagnant-water portion is higher than that in other portions.

Figure 9A:
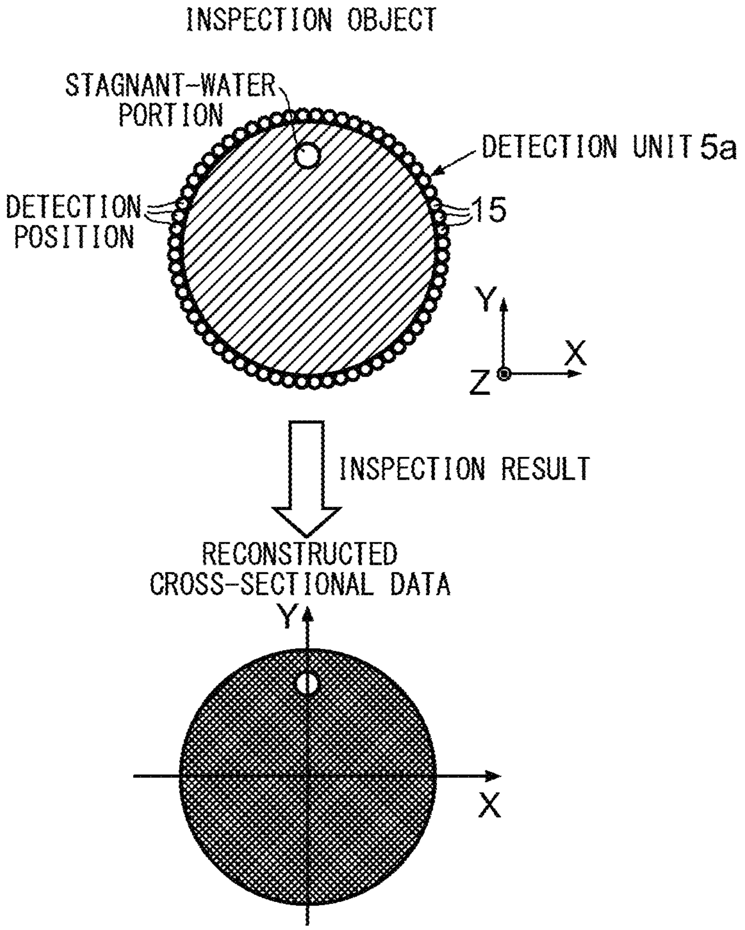
FIG. 9A is an illustration of non-destructive inspection according to the present embodiment.
Figure 9B:
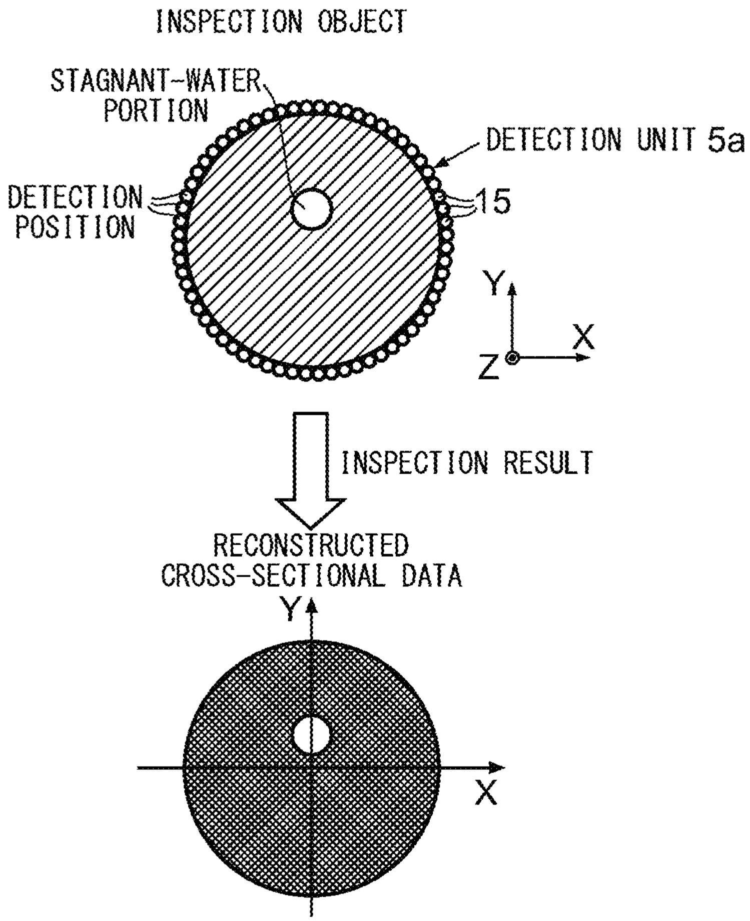
FIG. 9B is another illustration of the non-destructive inspection according to the present embodiment.
Figure 9C:
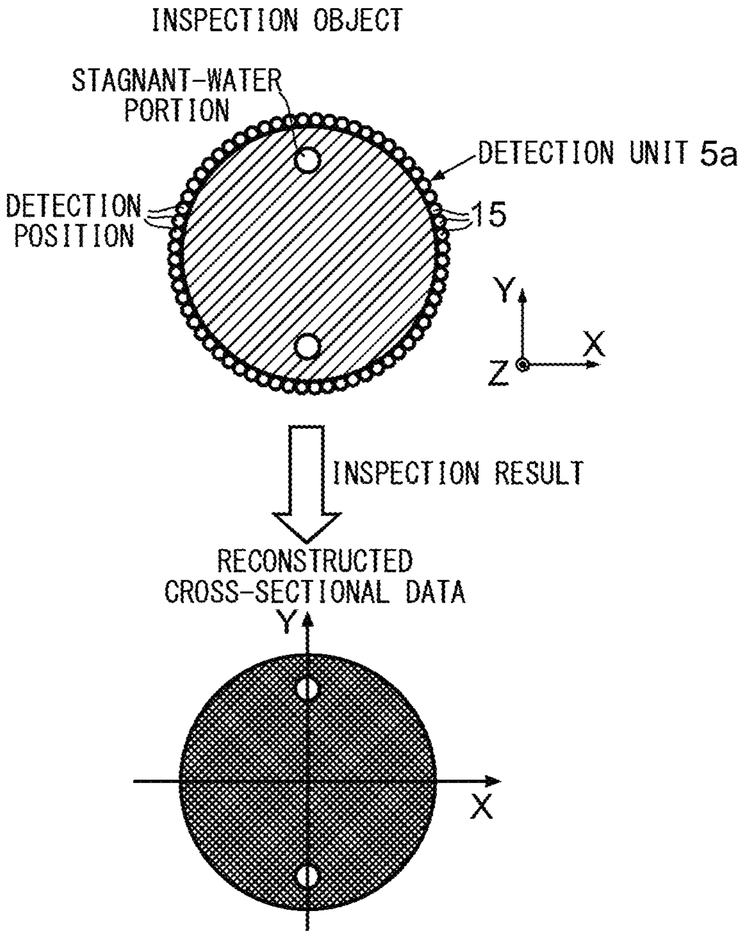
FIG. 9C is another illustration of the non-destructive inspection according to the present embodiment.

FIG. 9A to FIG. 9C are illustrations of the defect inspection by the cross-sectional image acquisition method according to the present embodiment. In each of these drawings, an upper part illustrates am imaginary cross-section of the inspection object 1 and the detection unit 5*a*, and a lower part illustrates the reconstructed cross-sectional data corresponding to the imaginary cross-section. In the upper parts of these drawings, the stagnant-water portion as a defect exists in the vicinity of the surface of the inspection object 1 in FIG. 9A, and exists at a deep position in the inspection object 1 in FIG. 9B, and two stagnant-water portions exist in FIG. 9C. The above-described cross-sectional image acquisition method is performed on the respective inspection objects 1 illustrated in the upper parts of FIG. 9A to FIG. 9C. Thereby, the reconstructed cross-sectional data illustrated in the lower parts of FIG. 9A to FIG. 9C are acquired. FIG. 9A to FIG. 9C each illustrate a case where the exit neutrons are detected at each detection position. Here, the exit neutrons detected at each detection position may be one type of, two types of, or three types of neutrons. Here, the types of neutrons consist of a thermal neutron, an intermediate neutron, and a fast neutron. The exit neutrons may be detected at each detection position, regardless of types of neutrons.

In each of FIG. 9A to FIG. 9C, the horizontal axis and the vertical axis in the reconstructed cross-sectional data in the lower part indicate the X axis and the Y axis of the XYZ coordinate system in the upper part, and the origin (intersection point) of the horizontal axis and the vertical axis corresponds to the center of the imaginary cross-section of the inspection object 1. In the reconstructed cross-sectional data in the lower part of each of FIG. 9A to FIG. 9C, neutron reaction rates are illustrated by a hatched portion and a white circle portion. The hatched portion is a portion having a small neutron reaction rate, and the white circle portion is a portion having a larger neutron reaction rate than that of the hatched portion. An outer periphery of the hatched portion corresponds to an outer periphery of the cross-section of the inspection object 1.

As illustrated in FIG. 9A to FIG. 9C, in the present embodiment, two-dimensional positions, sizes (the existing range), and the number of the stagnant-water portions in the imaginary cross-section can be recognized from the reconstructed cross-sectional data.

Figure 10A:
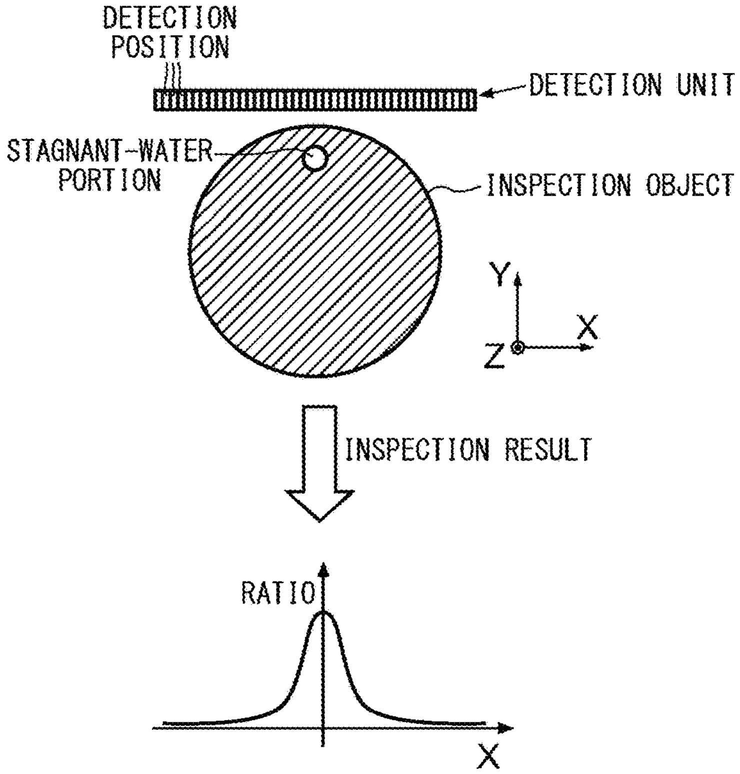
FIG. 10A is an illustration of non-destructive inspection according to a comparative example.
Figure 10B:
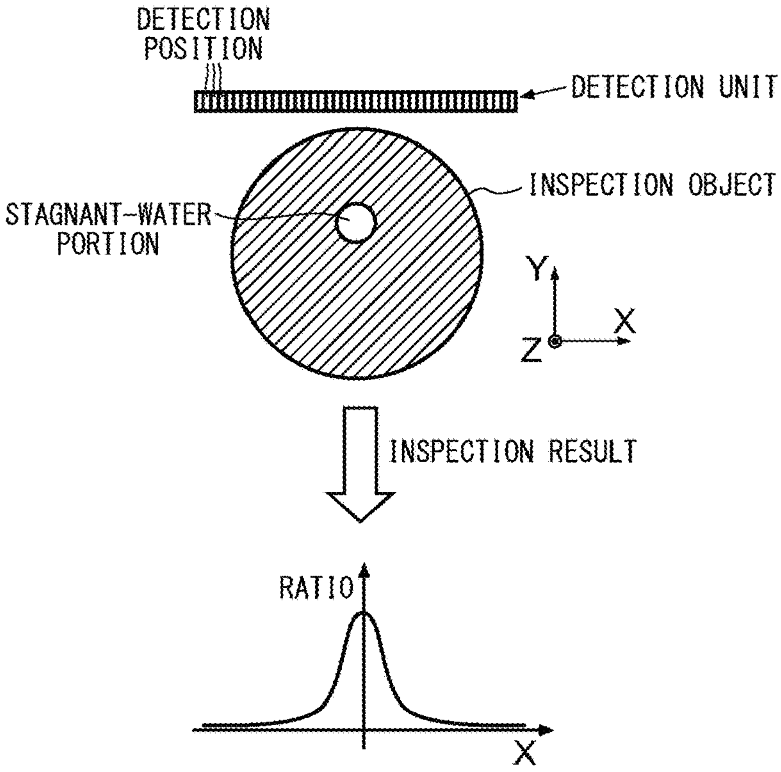
FIG. 10B is another illustration of the non-destructive inspection according to a comparative example.
Figure 10C:
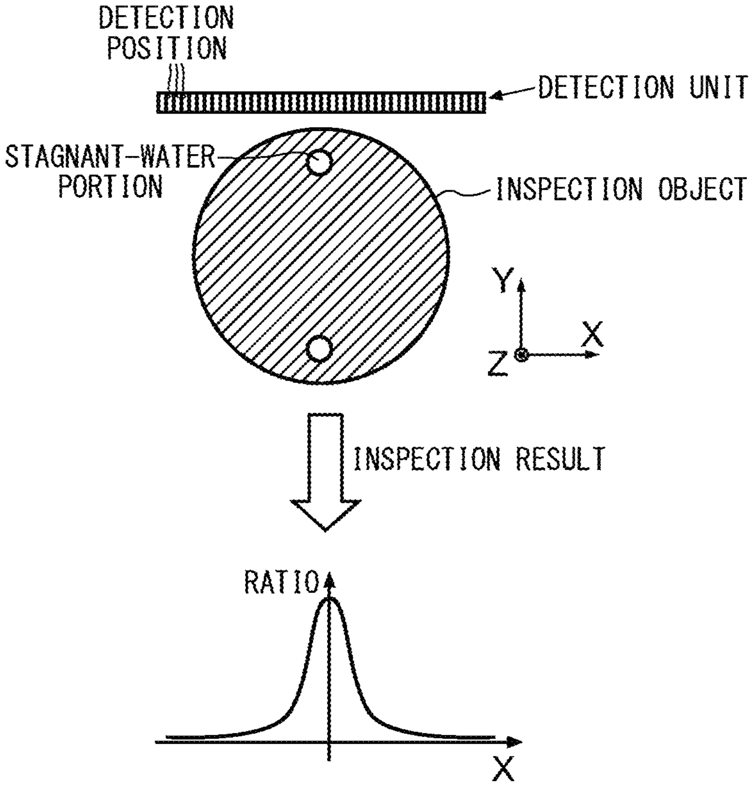
FIG. 10C is another illustration of the non-destructive inspection according to a comparative example.

FIG. 10A to FIG. 10C are illustrations of results acquired by performing inspection of comparative examples for the same inspection objects 1 and the same defects as those in FIG. 9A to FIG. 9C. The upper parts in FIG. 10A to FIG. 10C illustrate imaginary cross-sections of the inspection objects 1. As illustrated in the upper parts of FIG. 10A to FIG. 10C, detection positions of the detection unit 5*a* are arranged along the X axis in the XZ plane. In each of FIG. 10A to FIG. 10C, neutrons are emitted to the inspection object 1. Thereby, the scattered neutrons that have been scattered back in the inspection object 1 are detected at each of the detection positions of the detection unit 5*a*, the number of the detected scattered neutrons at each detection position is measured, and a ratio (a ratio of the number of the detected scattered neutrons to the above-mentioned reference value) is calculated.

The lower parts of FIG. 10A to FIG. 10C are graphs representing the inspection results in the comparative examples. In each of the graphs, the horizontal axis indicates the X coordinate in which the origin corresponds to the center of the imaginary cross-section of the inspection object 1, and the vertical axis indicates the above-mentioned ratio (the ratio of the number of the detected scattered neutrons to the reference value) at the X coordinate of each detection position.

In the case of the comparative examples, as illustrated in FIG. 10A and FIG. 10B, even when the depth or the size of the stagnant-water portion is different, the graphs of the inspection results have similar shapes. Thus, the depth or the size of the stagnant-water portion cannot be recognized. In the case of FIG. 10C, even when the two stagnant-water portions exist, these portions cannot be recognized. In contrast, in the case of the present embodiment, as illustrated in FIG. 9A to FIG. 9C, the positions, the sizes, and the number of the stagnant water portions a¥can be recognized.

Examples of cases as illustrated in FIG. 9A to FIG. 9C are described. In the case of FIG. 9A, data as illustrated in the above-described FIG. 8A to FIG. 8C are acquired.

Figure 11A:
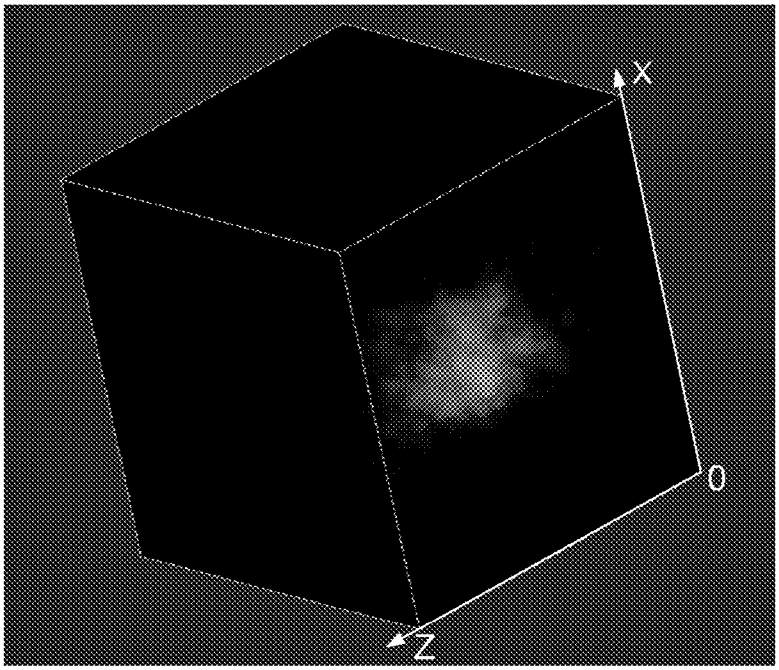
FIG. 11A illustrates other three-dimensional internal data acquired for the inspection object in which the stagnant-water spot is simulated by the polyethylene block.
Figure 11B:
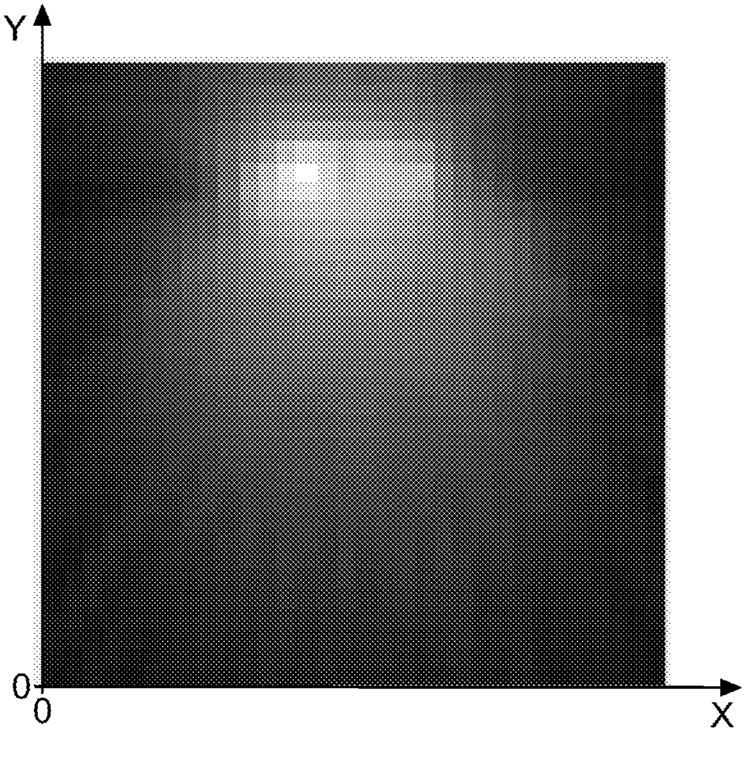
FIG. 11B is image data of an XY cross-section at Z=15 in FIG. 11A.
Figure 11C:
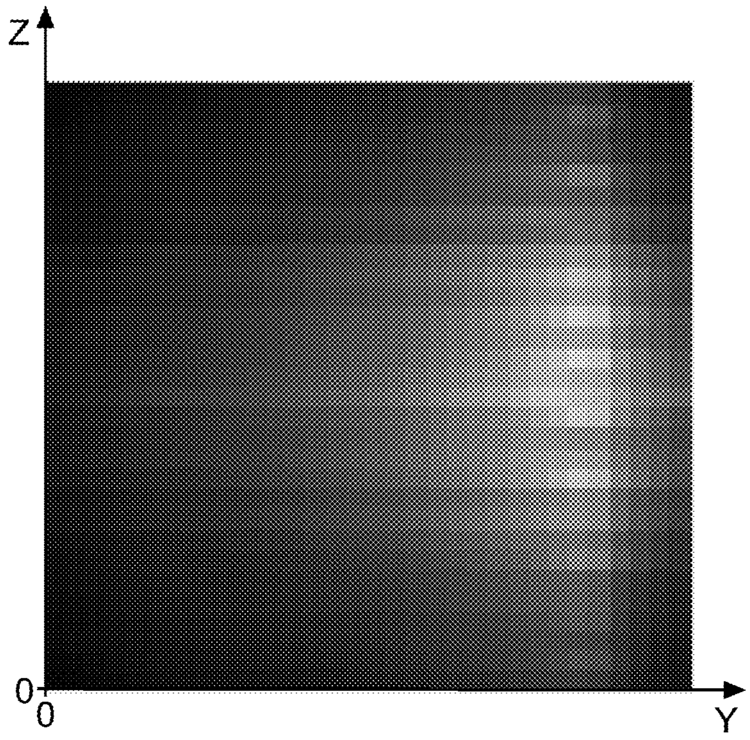
FIG. 11C is image data of the YZ cross-section at X=159 in FIG. 11A.

In the case of FIG. 9B, the cross-sectional image acquisition method according to the present embodiment was performed on the steel inspection object 1 in which a large stagnant-water spot is simulated by a polyethylene block. The thus-acquired three-dimensional internal data are illustrated in FIG. 11A. FIG. 11A is data when the polyethylene block as the large stagnant-water spot exists at a deep position as illustrated in FIG. 9B. This polyethylene block has a cylindrical shape in which a diameter and a thickness of the polyethylene block are 3 cm and 1 cm, respectively. The polyethylene block is positioned at a depth of 4.25 cm from the surface of the inspection object 1. FIG. 11B illustrates an XY cross-section at a Z coordinate at which the polyethylene block exists in FIG. 11A. FIG. 11C corresponds to a YZ cross-section at an X coordinate at which the polyethylene block exists in FIG. 11A. FIG. 11A to FIG. 11C illustrate neutron reaction rates by shading, and illustrate that a neutron reaction rate is higher at a position where the shading is lighter (the same applies to FIG. 12A to FIG. 12C described below).

As can be understood from comparison between FIG. 11A to FIG. 11C and FIG. 8A to FIG. 8C, the size and the depth of the stagnant-water spot in the inspection object 1 can be recognized from the reconstructed cross-sectional data and the three-dimensional internal data acquired in the present embodiment.

Figure 12A:
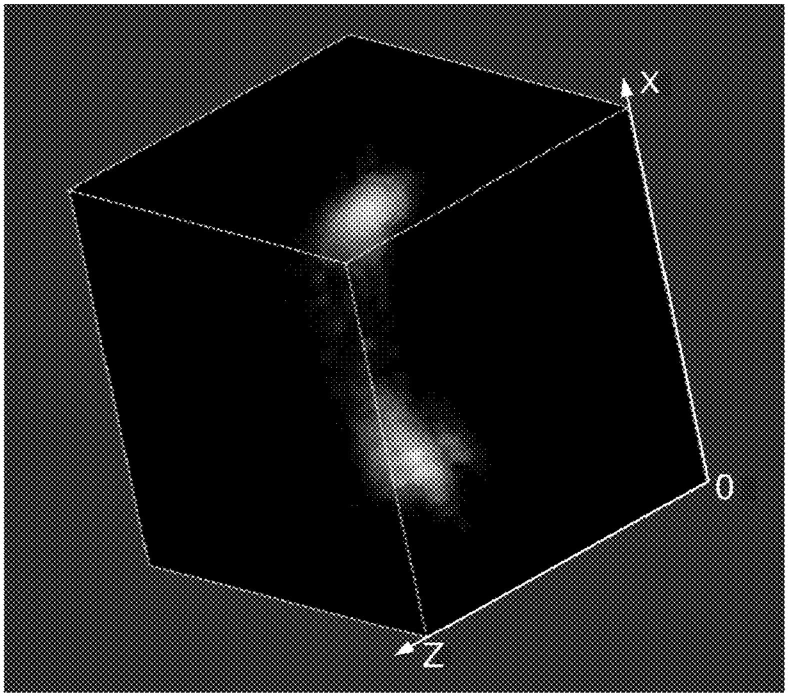
FIG. 12A illustrates other three-dimensional internal data acquired for the inspection object in which the stagnant-water spot is simulated by the polyethylene block.
Figure 12B:
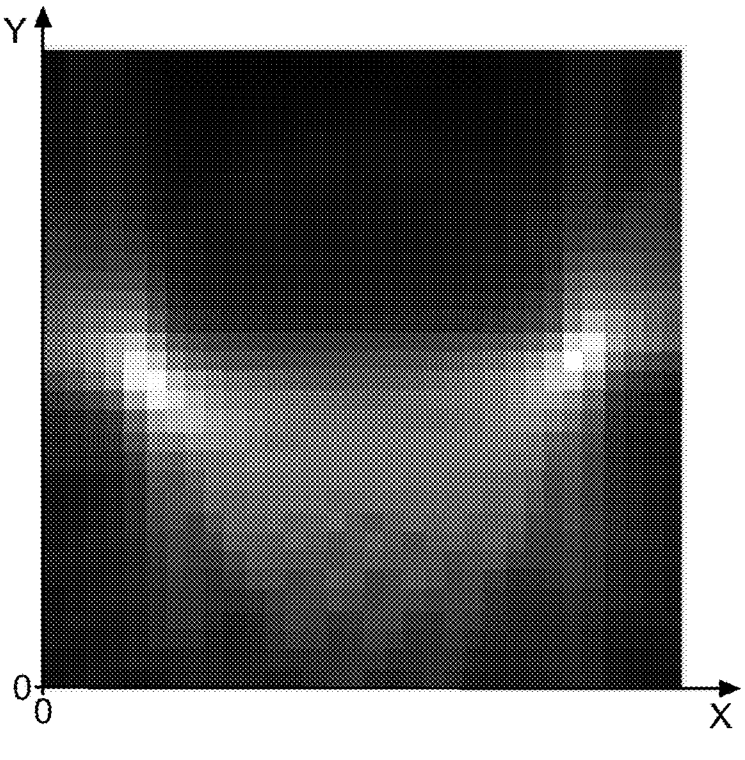
FIG. 12B is image data of the XY cross-section at Z=15 in FIG. 12A.
Figure 12C:
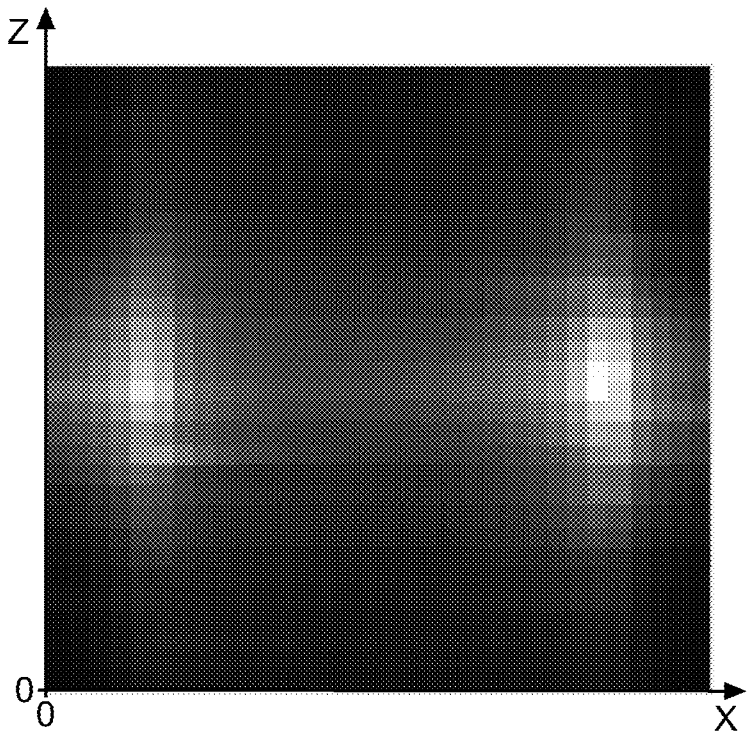
FIG. 12C is image data of the XZ cross-section at X=159 in FIG. 12A.

In the case of FIG. 9C, the cross-sectional image acquisition method according to the present embodiment was performed on a steel inspection object 1 in which two stagnant-water spots are simulated by polyethylene blocks. However, positions of the two polyethylene blocks are the same in the Y-axis direction and are different in the X-axis direction and the Z-axis direction. The three-dimensional internal data acquired by this cross-sectional image acquisition method is illustrated in FIG. 12A. FIG. 12A is data when the polyethylene blocks as the small stagnant-water spots exist at two shallow positions as illustrated in FIG. 9C. Each of the polyethylene blocks has a cylindrical shape in which a diameter and a thickness of the polyethylene block are each 1 cm. The polyethylene blocks are each positioned at a depth of 1.25 cm from the surface of the inspection object 1. FIG. 12B is image data of the XY cross-section at the Z coordinate at which the polyethylene blocks exist in FIG. 12A. FIG. 12C is image data of the XZ cross-section at the X coordinate at which the polyethylene blocks exist in FIG. 12A.

As can be understood from FIG. 12A to FIG. 12C, the positions and the number of the stagnant-water spots in the inspection object can be recognized from the reconstructed cross-sectional data and the three-dimensional internal data acquired in the present embodiment.

According to the embodiment of the present invention, when the three-dimensional internal data are generated as described above, a position and am existing range of a defect inside the inspection object 1 can be three-dimensionally recognized from the three-dimensional distribution of a neutron reaction rate represented by the three-dimensional internal data.

When the inspection object 1 is inspected for a state of fluid existing in an inside space of the inspection object 1, a state of the fluid existing inside the inspection object 1 can be two-dimensionally or three-dimensionally recognized from the reconstructed cross-sectional data or the three-dimensional internal data generated as described above. In this case, a neutron reaction rate at each position in the reconstructed cross-sectional data or the three-dimensional internal data is an average value over the above-described set measurement duration. In this case, the fluid inside the inspection object 1 may contain hydrogen as a constituent element of the fluid, but is not limited to this.

The inspection object 1 may be a pipe through which the fluid flows in the inside space of the inspection object 1. When the pipe is one through which a gas-liquid two-layer flow (e.g., a mixed fluid of air and water) containing hydrogen as a constituent element flows as the above-mentioned fluid, an average position or an existing range of a portion containing hydrogen (e.g., a portion of water) can be two-dimensionally or three-dimensionally recognized.

The inspection object 1 may be a cooling pipe that is provided in a fast breeder reactor and through which liquid sodium as a coolant flows. In this case, an average position or an existing range of air bubbles generated in the liquid sodium can be two-dimensionally or three-dimensionally recognized.

Alternatively, the inspection object 1 may be a blast furnace. In this case, a distribution of a gas in fluidized iron as the fluid can be two-dimensionally or three-dimensionally recognized. Here, the gas in the fluidized iron is a $CO_2$ gas generated by a reductive reaction or a generated gas derived from impurities.

Also when the inspection object 1 is inspected ss described above for a state of the fluid containing hydrogen as a constituent element thereof and existing in an inside space of the inspection object 1, the detection unit 5*a* may be configured to selectively detect the neutrons (e.g., thermal neutrons) each having an energy lower than the predetermined value.

The present invention is not limited to the above-described embodiment, and it is apparent that various modifications may be made within the scope of the technical idea of the present invention. For example, the observation device 10 according to the embodiment of the present invention does not need to include all of a plurality of the above-described matters, and may include only a part of a plurality of the above-described matters.

Any one of the following modified examples 1 to 6 may be adopted alone, or two or more of the modified examples 1 to 6 may be optionally adopted in combination. In this case, the points that are not described below are the same as those described above.

Modified Example 1

In the above description, in a case of generating the three-dimensional internal data, a plurality of pieces of the reconstructed cross-sectional data are generated by performing the above-described steps S4 and S5 for each of a plurality of the inspection planes, concerning the step S3 performed once, and the three-dimensional data generation unit generates the three-dimensional internal data from a plurality of pieces of the reconstructed cross-sectional data. However, the above-described steps S4 and S5 may performed for one inspection plane (or each of a plurality of the inspection planes) concerning the step S3 performed once, and thereby, one piece (or a plurality of pieces) of reconstructed cross-sectional data may be generated. In this case, by shifting a position of the detection unit 5*a* in the direction of the reference line L from a position in state in the previous step S3 and then performing the steps S3 to S5 again, one piece (or a plurality of pieces) of the reconstructed cross-sectional data may be generated. By repeating such processing, a plurality of pieces (or a large number of pieces) of reconstructed cross-sectional data are generated, and the three-dimensional data generation unit 7*c* may generate the three-dimensional internal data from a plurality of pieces (or a large number of pieces) of the reconstructed cross-sectional data.

Modified Example 2

In the example in FIG. 1, the neutron emission device 3 emits the neutrons to the inspection object 1 in a negative Y-axis direction, but the emission direction may be any direction. For example, in FIG. 1, the neutron emission device 3 may emit the neutrons to the inspection object 1 in the Z-axis direction. As in the example in FIG. 1, the neutron emission device 3 may emit the neutrons to the inspection object 1 in one direction when viewed from the inspection object 1, or may emit the neutrons to the inspection object 1 in a plurality of directions when viewed from the inspection object 1.

Modified Example 3

In the above description, a ratio of each detection position is calculated to generate the reconstructed cross-sectional data. However, in the following case, a ratio of each detection position does not need to be calculated. In other words, in a case where the inspection object 1 is in the above-described reference state (e.g., a state in which no defects exist), when the respective numbers (i.e., the reference values) of detected exit neutrons at one set of detection positions become substantially the same because of an emission direction of the neutrons and a property of the inspection object 1, the reconstruction unit 7*b* may perform the reconstruction processing on the respective numbers of detected exit neutrons at one set of detection positions without calculation of a ratio of each of the detection positions, and may thereby generate the reconstructed cross-sectional data. In this case, in the above description concerning the reconstruction processing, the "ratio" is replaced with the "number of detected exit neutrons".

Modified Example 4

Figure 13:
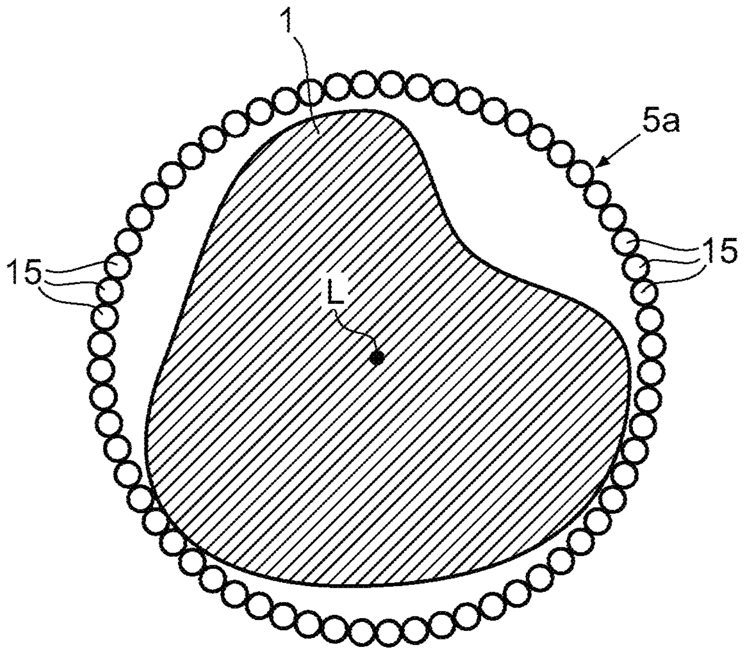
FIG. 13 illustrates a cross-section of an inspection object having another shape to which the present embodiment is applicable.

The inspection object 1 does not need to have a cylindrical shape as illustrated in FIG. 1. FIG. 13 illustrates a cross-section of an inspection object 1 having another shape. The inspection object 1 in FIG. 13 may extend in a direction of a reference line L intersecting(perpendicular to) the paper surface of this drawing. As illustrated in FIG. 13, the inspection object 1 may have a shape that can be surrounded by one set of detection positions (detectors 15).

Modified Example 5

The data processing device 7 generates transformed data acquired by coordinate-transforming the above-described data S(j, p) in the jp coordinate system. However, this transformed data may be data acquired by transforming at least the p-coordinate of the j-coordinate and the p-coordinate in the data S(j, p) into the y-coordinate depending on the set effective detection area at each p-coordinate. The larger the set effective detection area of the p-coordinate (a p-coordinate range corresponding to one detection position) is, the larger a width (a width in the y-axis direction) of the transformed y-coordinate (y-coordinate range) corresponding to the p-coordinate may be in the transformed data.

For example, when S(j, p) in the jp coordinate system representing the second two-dimensional image data is transformed into the transformed data F(x, y) in the xy coordinate system, the expression for transforming the j-coordinate into the y-coordinate may be other than y=a cos (x x p/Q) in the above Expression (6). In other words, the data processing device 7 may transform the p-coordinate of S(j, p) into the y-coordinate by Expression y=g(p) depending on the set effective detection area of the detection position (detector 15) corresponding to each pixel p in each line j of the second two-dimensional image data. Here, the set effective detection area is an effective area for the above-described neutron flight direction j corresponding to the j-th line (the line of the pixels) in the second two-dimensional image data as described above. The function g(p) is a function of p, and when g(p) is the same as the above Expression (6), y is expressed as y=g(p)=a cos (xx p/Q).

When the above-described set effective detection area cannot be expressed by cosine or the one set of detection positions (detectors 15) are not arranged on the circle, the p-coordinate can be transformed into the y-coordinate by Expression y=g(p) different from the above Expression (6).

The above-described transformed data may be data F (j, y) acquired by coordinate-transforming only the p-coordinate of the j-coordinate and the p-coordinate in the data S(j, p) by the above Expression (6).

Modified Example 6

The ratio calculation unit 7*a* may calculate the above-described ratio by using the normalized reference value and the normalized number of detected exit neutrons as follows.

A reference value of each of one set of detection positions may be a value acquired by normalizing, by Na, the number αi of the exit neutrons that are detected at the detection position i as a result of the incidence of Na neutrons on the inspection object 1 in a state (the above-described reference state) in which no defects exist present inside the inspection object 1 (i is an identifier of the detection position). In other words, the reference value Ri of each of one set of detection positions i may be Ri=αi/Na.

Similarly, the number of detected exit neutrons detections at one set of detection positions may be a value acquired by normalizing, by Nb, the number βi of the exit neutrons that are detected at the detection position i as a result that the neutron emission device 3 makes Nb neutrons incident on the inspection object 1 at the above-described step S3. In other words, the number of detected exit neutrons Di at each of one set of detection positions i may be Di=βi/Nb.

The ratio calculation unit 7*a* calculates, as Di/Ri, a ratio at each of one set of detection positions i. At the time of calculating the ratio, the ratio calculation unit 7*a* may calculate the number of detected exit neutrons Di=βi/Nb from the known Nb and βi measured by the measurement unit 5*b*. The normalized reference value Ri may be stored in the storage unit 7*d*.

In such a modified example 6, the above-described Na and Nb may be different from each other, and a duration during which neutrons are emitted to the inspection object 1 at the step S3 may be different from the associated set emission duration in setting the reference value. In the modified example 6, a duration during which the number of detected exit neutrons detections are measured at the step S4 and the associated set measurement duration in setting the reference value may be a duration until the number of neutrons exiting from the inspection object 1 per unit time becomes sufficiently small (e.g., substantially zero).

DESCRIPTION OF REFERENCE NUMERALS

1: inspection object
3: neutron emission device
3*a*: neutron source
3*b*: collimator
5: detection device
5*a*: detection unit
5*b*: measurement unit
7: data processing device
7*a*: ratio calculation unit
7*b*: reconstruction unit
7*c*: three-dimensional data generation unit
7*d*: storage unit
7*e*: storage unit
9: display
10: observation device
15: detector
L: reference line

The invention claimed is:

1. An observation device comprising:

a neutron emission device that emits neutrons to an inspection object in an emission direction so that the neutrons are scattered inside the inspection object;

a detection device that detects the neutrons exiting from the inspection object, at one set of detection positions arranged in order in a peripheral direction around the inspection object, outside the inspection object, and measures a number of the detected neutrons for each of the detection positions, wherein a pixel value based on the number of the detected neutrons is defined as Ci, where i is an identification number for each of the one set of detection positions and is an integer of 0 to N-1, where N is the total number of the one set of detection positions, for a plurality of detection positions that are a part of the one set of detection positions and that are continuously arranged in a continuous range in the peripheral direction, a one-dimensional extraction image-data piece is defined as image data in which a plurality of pixels having the corresponding pixel values Ci of the plurality of detection positions are arranged in a first direction in same order as arrangement order of the plurality of detection positions; and a data processing device that:

generates, based on the pixel values Ci, a plurality of the one-dimensional extraction image-data pieces corresponding to the continuous ranges different from each other, where an identification number j is defined for each of the plurality of one-dimensional extraction image-data pieces, and for each one-dimensional extraction image-data piece i, a corresponding neutron flight direction j is defined as a direction that is independent of the emission direction and that faces entirety of the plurality of detection positions corresponding to the one-dimensional extraction image-data piece j, performs coordinate-transforms for each one-dimensional extraction image-data piece j into a one-dimensional transformation image-data piece such that, for each one-dimensional extraction image-data piece j, each coordinate in the one-dimensional extraction image-data piece j is transformed into a coordinate that depends on an effective detection area for the neutron flight direction j independent of the emission direction, the effective detection area being set for the coordinate in the one-dimensional extraction image-data piece; and generates reconstructed cross-sectional data representing a two-dimensional distribution of a neutron reaction rate in an imaginary cross-section of the inspection object, based on a plurality of the one-dimensional transformation image-data pieces coordinate-transformed from the plurality of one-dimensional extraction image-data pieces j, where for each one-dimensional extraction image-data piece j, as the set effective detection area of the coordinate in the one-dimensional extraction image-data piece j is larger, the coordinate in the one-dimensional extraction image-data piece j is transformed into the coordinate having a larger coordinate width in the one-dimensional transformation image data.

2. The observation device according to claim 1, wherein the one set of detection positions is set to surround the inspection object.

3. The observation device according to claim 1, wherein the data processing device includes a ratio calculation unit that calculates, for each of the one set of detection positions, a ratio of the number of the detected neutrons to a reference value the pixel value Ci based on the number of the detected neutrons at each of the one set of detection positions indicates the ratio for the detection position, and the reference value varies depending on the detection position.

4. The observation device according to claim 3, wherein the inspection object is one inspected for a defect that can exist inside the inspection object, and the reference value varying depending on the detection position is set as a number of detected neutrons in an assumed case where the defect does not exist in the inspection object.

5. The observation device according to claim 3, wherein the inspection object is one inspected for a state of a fluid existing in an inside space of the inspection object, and the reference value varying depending on the detection position is set as a number of detected neutrons in an assumed case where the entire inside space is in a uniform state.

6. The observation device according to claim 1, wherein:

image data in which the pixels of $C_0$ to $C_{N-1}$ are arranged in this order in the first direction are defined as one-dimensional image data, image data in which a plurality of pieces of the one-dimensional image data are arranged in a second direction intersecting the first direction are defined as first two-dimensional image data, in the first two-dimensional image data, each of the pieces of the one-dimensional image data excluding the most front one-dimensional image data in the second direction is data in which, in a direction of circulating the pixels in the first direction, the pixels of $C_0$ to $C_{N-1}$ are shifted by a predetermined shift amount from those of the different one-dimensional image data adjacent to the one-dimensional image data from a front side in the second direction, the data processing device:

generates second two-dimensional image data that are data extracted from the first two-dimensional image data, over a continuous range in the first direction corresponding to a range along a periphery around the inspection object and equal to or shorter than half of the periphery around the inspection object, performs the reconstruction processing based on the second two-dimensional image data, and thereby generates the reconstructed cross-sectional data, and the second two-dimensional image data are image data in which the plurality of one-dimensional extraction image-data pieces are arranged in the second direction.

7. The observation device according to claim 6, wherein the second two-dimensional image data are data S(j, p) representing a pixel value at each coordinate (j, p) in a jp coordinate system, j represents a coordinate in the second direction, p represents a coordinate in the first direction, and a line of the pixels consecutive at each coordinate j in the data S(j, p) constitute the one-dimensional extraction image-data piece j having the identification number j of the coordinate j, j takes a value of 0 to M-1, and p takes a value of 0 to Q-1, wherein M is a number of pieces of the one-dimensional image data constituting the second two-dimensional image data, and Q is a number of the detection positions corresponding to the one-dimensional extraction image-data piece, the all pixel value at each coordinate p in each coordinate j is regarded as a pixel value based on the number of detected exit neutrons in the set effective detection area depending on each coordinate p, the data processing device coordinate-transforms the data S(j, p) in the jp coordinate system, thereby generates transformed data constituted by the plurality of one-dimensional transformation image-data pieces, and performs the reconstruction processing on the transformed data to generate the reconstructed cross-sectional data, the transformed data are data acquired by transforming at least the p coordinate out of the j coordinate and the p coordinate in the data S(j, p) into a y coordinate depending on the set effective detection area at each p coordinate, and for the p coordinate having the larger set effective detection area, the transformed y coordinate corresponding to the p coordinate has the larger coordinate width in the transformed data.

8. The observation device according to claim 7, wherein the transformed data are data F(x, y) representing a pixel value at each coordinate (x, y) in an xy coordinate system, the data processing device coordinate-transforms the second two-dimensional image data S(j, p) into the transformed data F(x, y) by expressions of $$x=j/M, \text{ and}$$

$$y=g(p)$$

where g(p) is a function of p.

9. The observation device according to claim 8, wherein g(p) is $a\cos(\pi \times p/Q)$, where a is a preset coefficient.

10. The observation device according to claim 1, wherein the peripheral direction is a direction of rotating around an imaginary reference line passing through an inside of the inspection object, and an imaginary plane intersecting the reference line is defined as an inspection plane, for each of the inspection planes whose positions in a direction of the reference line are different from each other, the detection device detects the neutrons exiting from the inspection object at each of the one set of detection positions in the peripheral direction on the inspection plane, and measures the number of the exit neutrons at each of the detection positions, the data processing device:

generates, for each of the inspection planes, the reconstructed cross-sectional data, based on the number of detected neutrons at each of the one set of detection positions on the inspection plane, and generates three-dimensional internal data, based on a plurality of pieces of the reconstructed cross-sectional data, and the three-dimensional internal data represent a three-dimensional distribution of a neutron reaction rate inside the inspection object.

11. A cross-sectional image acquisition method comprising:

emitting neutrons to an inspection object in an emission direction so that the neutrons are scattered inside the inspection object; and detecting the neutrons exiting from the inspection object as a result of the emitting, at one set of detection positions arranged in order in a peripheral direction around the inspection object, and measuring a number of the detected neutrons at each of the detection positions, wherein a pixel value based on the number of the detected neutrons is defined as Ci, where i is an identification number for each of the one set of detection positions and takes an integer of 0 to N-1, and N is the total number of the one set of detection positions, for a plurality of detection positions that are a part of the one set of detection positions and that are continuously arranged in a continuous range in the peripheral direction, a one-dimensional extraction image-data piece is defined as image data in which a plurality of pixels having the corresponding pixel values Ci of the plurality of detection positions are arranged in a first direction in same order as arrangement order of the plurality of detection positions, the cross-sectional image acquisition method comprises using a data processing device to:

generate, based on the pixel values Ci, a plurality of the one-dimensional extraction image-data pieces corresponding to the continuous ranges different from each other, where j is defined as an identification number for each of the plurality of one-dimensional extraction image-data pieces, for each one-dimensional extraction image-data piece j, a neutron flight direction j is defined as a direction that is independent of the emission direction and that faces entirety of the plurality of detection positions corresponding to the one-dimensional extraction image-data piece j, coordinate-transform each one-dimensional extraction image-data piece j into one-dimensional transformation image-data piece such that, for each one-dimensional extraction image-data piece i, each coordinate in the one-dimensional extraction image-data piece j is transformed into a coordinate that depends on an effective detection area for the neutron flight direction j independent of the emission direction, the effective detection area being set for the coordinate in the one-dimensional extraction image-data piece; and generate reconstructed cross-sectional data representing a two-dimensional distribution of a neutron reaction rate in an imaginary cross-section of the inspection object, based on a plurality of the one-dimensional transformation image-data pieces coordinate-transformed from the plurality of one-dimensional extraction image-data pieces j, and for each one-dimensional extraction image-data piece j, as the set effective detection area of the coordinate in the one-dimensional extraction image-data piece j is larger, the coordinate in the one-dimensional extraction image-data piece j is transformed into the coordinate having a larger coordinate width in the one-dimensional transformation image data.

12. The cross-sectional image acquisition method according to claim 11, wherein the peripheral direction is a direction of rotating around an imaginary reference line passing through an inside of the inspection object, and an imaginary plane intersecting the reference line is defined as an inspection plane, the method further comprises:

for the one set of detection positions on each of the inspection planes whose positions in a direction of the reference line are different from each other, detecting, at each of the one set of detection positions, neutrons that exit from the inspection object as a result of emitting neutrons to the inspection object, and measuring the number of the detected neutrons at each of the detection positions;

for each of the inspection planes, by the data processing device, performing the reconstruction processing based on the number of detected exit-neutrons at each of the one set of detection positions, and thereby generating the reconstructed cross-sectional data; and generating three-dimensional internal data based on a plurality of pieces of the reconstructed cross-sectional data, and the three-dimensional internal data represent a three-dimensional distribution of a neutron reaction rate inside the inspection object.

13. The cross-sectional image acquisition method according to claim 11, wherein the one set of detection positions is set to surround the inspection object.

14. The cross-sectional image acquisition method according to claim 11, comprising:

by the data processing device, calculating, for each of the one set of detection positions, a ratio of the number of the detected neutrons to a reference value, wherein the pixel value Ci based on the number of the detected neutrons at each of the one set of detection positions indicates the ratio for the detection position, and the reference value varies depending on the detection position.

15. The cross-sectional image acquisition method according to claim 14, wherein the inspection object is one inspected for a defect that can exist inside the inspection object, and the reference value varying depending on the detection position is set as a number of detected neutrons in an assumed case where the defect does not exist in the inspection object.

16. The cross-sectional image acquisition method according to claim 14, wherein the inspection object is one inspected for a state of a fluid existing in an inside space of the inspection object, and the reference value varying depending on the detection position is set as a number of detected neutrons in an assumed case where the entire inside space is in a uniform state.

17. The cross-sectional image acquisition method according to claim 11, wherein image data in which the pixels of C0 to CN-1 are arranged in this order in the first direction are defined as one-dimensional image data, image data in which a plurality of pieces of the one-dimensional image data are arranged in a second direction intersecting the first direction are defined as first two-dimensional image data, in the first two-dimensional image data, each of the pieces of the one-dimensional image data excluding the most front one-dimensional image data in the second direction is data in which, in a direction of circulating the pixels in the first direction, the pixels of C0 to CN-1 are shifted by a predetermined shift amount from those of the different one-dimensional image data adjacent to the one-dimensional image data from a front side in the second direction, the cross-sectional image acquisition method comprises:

by the data processing device, generating second two-dimensional image data that are data extracted from the first two-dimensional image data, over a continuous range in the first direction corresponding to a range along a periphery around the inspection object and equal to or shorter than half of the periphery around the inspection object, performing the reconstruction processing based on the second two-dimensional image data, and thereby generating the reconstructed cross-sectional data, and the second two-dimensional image data are image data in which the plurality of one-dimensional extraction image-data pieces are arranged in the second direction.

18. The cross-sectional image acquisition method according to claim 11, wherein the second two-dimensional image data are data S(j, p) representing the pixel value at each coordinate (j, p) in a jp coordinate system, j represents a coordinate in the second direction, p represents a coordinate in the first direction, and a line of the pixels consecutive at each coordinate j in the data S(j, p) constitute the one-dimensional extraction image-data piece j having the identification number j of the coordinate j, j takes a value of 0 to M-1, and p takes a value of 0 to Q-1, wherein M is a number of pieces of the one-dimensional image data constituting the second two-dimensional image data, and Q is a number of the detection positions corresponding to the one-dimensional extraction image-data piece, the pixel value at each coordinate p in each coordinate j is regarded as a pixel value based on the number of detected neutrons in the set effective detection area depending on each coordinate p, the cross-sectional image acquisition method comprises:

by the data processing device, coordinate-transforming the data S(j, p) in the jp coordinate system, thereby generates transformed data constituted by the plurality of one-dimensional transformation image-data pieces, and performing the reconstruction processing on the transformed data to generate the reconstructed cross-sectional data, the transformed data are data acquired by transforming at least the p coordinate out of the j coordinate and the p coordinate in the data S(j, p) into a y coordinate depending on the set effective detection area at each p coordinate, and for the p coordinate having the larger set effective detection area, the transformed y coordinate corresponding to the p coordinate has the larger width in the transformed data.

19. The cross-sectional image acquisition method according to claim 18, wherein the transformed data are data F(x, y) representing a pixel value at each coordinate (x, y) in an xy coordinate system, the cross-sectional image acquisition method comprises:

by the data processing device, coordinate-transforming the second two-dimensional image data S(j, p) into the transformed data F(x, y) by expressions of $$x=j/M, \text{ and}$$

$$y=g(p)$$

where g(p) is a function of p.

20. The cross-sectional image acquisition method according to claim 19, wherein g(p) is acos(Π×p/Q), where a is a preset coefficient.

* * * * *